(12) United States Patent
Nakajima et al.

(10) Patent No.: US 7,110,674 B2
(45) Date of Patent: Sep. 19, 2006

(54) OPTICAL ADD/DROP DEVICE

(75) Inventors: Ichiro Nakajima, Kawasaki (JP); Satoshi Kuroyanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/066,465

(22) Filed: Feb. 28, 2005

(65) Prior Publication Data

US 2005/0175342 A1    Aug. 11, 2005

Related U.S. Application Data

(62) Division of application No. 09/928,360, filed on Aug. 14, 2001, now abandoned.

(30) Foreign Application Priority Data

Jan. 10, 2001    (JP) .............. 2001-002334

(51) Int. Cl.
G02F 1/00    (2006.01)
H04J 14/02    (2006.01)
(52) U.S. Cl. .................. 398/83; 398/4; 398/5
(58) Field of Classification Search ............ 398/3–5, 398/83
See application file for complete search history.

(56) References Cited

U.S. PATENT DOCUMENTS

| 5,442,623 A | * | 8/1995 | Wu ..................... 370/224 |
| 5,805,320 A | | 9/1998 | Kuroyanagi et al. |
| 5,878,177 A | | 3/1999 | Karasan et al. |
| 6,570,685 B1 | * | 5/2003 | Fujita et al. .............. 398/79 |
| 6,735,390 B1 | | 5/2004 | Prasanna |

FOREIGN PATENT DOCUMENTS

| JP | 10508437 B2 | 8/1998 |
| JP | 2000004460 | 1/2000 |

* cited by examiner

*Primary Examiner*—Dalzid Singh
(74) *Attorney, Agent, or Firm*—Staas & Halsey LLP

(57) ABSTRACT

Disclosed herein is an optical add/drop device including an optical demultiplexer for separating WDM signal light into n optical signals where n is an integer not less than 2, n first optical switches to which the n optical signals output from the optical demultiplexer are supplied, respectively, a second optical switch for adding provided on the input side of the first optical switches, a third optical switch for dropping provided on the output side of the first optical switches, n regenerators for wavelength converting the optical signals passed through the first optical switches, and an optical multiplexer for wavelength division multiplexing the wavelength-converted optical signals. A transmission distance between nodes can be increased by using this device.

3 Claims, 22 Drawing Sheets

(m=k+r)

(q=k+s)

(q=k+s)

⟶ :MAIN FIBER    ➙ :MAIN TRAFFIC
--➤ :STANDBY FIBER   ❙❙➤ :LOW-PRIORITY TRAFFIC

⟶ : MAIN FIBER ⟶ : MAIN TRAFFIC
---> : STANDBY FIBER ---> : LOW-PRIORITY TRAFFIC

⟶ : MAIN FIBER    ⟶ : MAIN TRAFFIC
--- ⟶ : STANDBY FIBER    --- ⟶ : LOW-PRIORITY TRAFFIC

OPTICAL ADD/DROP DEVICE

CROSS-REFERENCE TO RELATED APPLICATION

This application is a Divisional application of application Ser. No. 09/928,360, filed Aug. 14, 2001 which is now abandoned, the enclosure of which is incorporated herein by reference.

BACKGROUND OF THE INVENTION

1. Field of the Invention

The present invention relates to an optical add/drop device.

2. Description of the Related Art

With a recent increase in traffic, a large-capacity network has been required. To meet this requirement, the construction of a WDM (wavelength division multiplexing)-based optical network will be necessary in a future trunk network. An optical add/drop device (optical ADM: optical add/drop multiplexer) capable of adding and/or dropping optical signals having different wavelengths by the wavelength between this device and another network device such as a router and an ATM (asynchronous transfer mode) switch is used in an optical network. It is important to form a ring network by using this optical ADM and to form an optical network tolerant of failure.

FIG. 1 is a block diagram of a general optical add/drop device in the prior art. An optical add/drop device 2 is arranged along an optical transmission line 4 for transmitting WDM signal light obtained by wavelength division multiplexing a plurality of optical signals having different wavelengths $\lambda 1$ to $\lambda n$ (n is an integer satisfying 1<n). This device 2 has an optical demultiplexer 6 for separating the WDM signal light supplied from the input-side optical transmission line 4 into the optical signals having the wavelengths $\lambda 1$ to $\lambda n$, n 2×2 optical switches 8 for selecting optical signals to be passed through this device 2 and optical signals to be added/dropped, and an optical multiplexer 10 for wavelength division multiplexing optical signals to be output to the output-side optical transmission line 4.

k (k is an integer satisfying 1<k) regenerators 14 each having a wavelength conversion function are provided for an interface between this device 2 and another network device for an add signal, such as a router 12, and k regenerators 18 each having a wavelength conversion function are provided for an interface between this device 2 and another network device for a drop signal, such as an ATM switch 16.

Examples of each optical switch include a waveguide switch using a thermooptic effect and a mechanical switch having a motor. Examples of a wavelength converter usable as each regenerator include an all-optical wavelength converter using a semiconductor optical amplifier and a wavelength converter using opto/electrical conversion and electro/optical conversion. Examples of the optical multiplexer or the optical demultiplexer include a device using an arrayed waveguide grating (AWG) and a device using a dielectric multilayer film.

A device controller 20 is provided in the optical add/drop device 2 to perform setting or the like for signal adding, dropping, or passing according to instructions from an operation system 22 for supervising and controlling the whole of an optical network. In this manner, the optical add/drop device 2 selects signal adding, dropping, or passing to thereby allow a flexible operation of the optical network.

In the device shown in FIG. 1, an optical signal from the router 12 is wavelength converted by each regenerator 14 and accommodated into the optical network at the wavelength assigned to an input port of the optical multiplexer 10. That is, wavelengths are fixedly assigned in the optical network. For more flexible and efficient operation of the optical network, it is desirable that an optical signal can be accommodated into the optical network at an arbitrary wavelength.

FIG. 2 is a block diagram of an improved optical add/drop device in the prior art. In this device, k tunable wavelength converters 28 are used in place of the k regenerators 14 shown in FIG. 1. Further, a k×n optical switch 24 is provided between the tunable wavelength converters 28 and the optical switches 8, and an n×k optical switch 26 is provided between the regenerators (wavelength converters) 18 and the optical switches 8. The optical switches 24 and 26 may be replaced by AWGs. The number k represents the number of ports of an intraoffice interface between this device and another network device such as a router 12 and an ATM switch 16, and the number n represents the number of WDM channels. Accordingly, k□n in general.

In the improved optical add/drop device mentioned above, an optical signal from the router 12 can be wavelength converted to be added to an arbitrary wavelength channel owing to the use of the tunable wavelength converters 28 and the optical switch 24. In case of converting the wavelength of an optical signal to be added into a wavelength $\lambda n$, the optical switch 24 is controlled to perform routing so that the optical signal from the router 12 is passed through the optical switch 8 connected to the input port of the optical multiplexer 10 corresponding to the wavelength $\lambda n$.

In the prior art, the optical signals passing through the optical add/drop device are not subjected to wavelength conversion. Accordingly, a function of waveform shaping or the like associated with signal regeneration processing cannot be obtained, so that long-haul transmission is difficult to attain.

Further, in the prior art, a tunable wavelength converter including a tunable light source is necessary at an interface between the optical add/drop device and another network device such as a router and an ATM switch, so as to add a signal from the other network device to an arbitrary wavelength channel in the optical network.

Referring to FIGS. 3A and 3B, there are shown different tunable light sources in the prior art. In the configuration shown in FIG. 3A, a plurality of laser diodes (LD1 to LDn) 30 are kept steadily driven, and CW light (DC light or unmodulated light) output from one of the laser diodes 30 selected by an n×1 optical switch 32 is modulated by an optical modulator (Mod) 34 to obtain an optical signal having a desired wavelength. An optical signal from another network device is converted into an electrical signal by an opto/electrical (O/E) converter 36, and this electrical signal is supplied as a modulating signal to the optical modulator 34. The optical switch 32 is controlled by a device controller 38.

In this configuration, the time for switching wavelengths depends on the transit time of the optical switch 32. Further, there is a possibility of crosstalk in the optical switch 32 and an increase in cost and power consumption.

In the configuration shown in FIG. 3B, a plurality of drive circuits (DRV) 42 respectively associated with a plurality of laser diodes 40 are turned on/off by a device controller 44 to select one of the laser diodes 40 and steadily drive it. CW light output from the selected laser diode 40 is modulated by an optical modulator 48 to thereby obtain an optical signal having a desired wavelength. An optical signal from another network device is converted into an electrical signal by an opto/electrical converter 50, and this electrical signal is supplied as a modulating signal to the optical modulator 48. The plural laser diodes 40 and the optical modulator 48 are optically connected by an AWG 46.

Also in this configuration, the LDs and the DRVs whose number corresponds to the number of wavelengths for each are required as similar to the previous configuration shown in FIG. 3A, causing an increase in cost.

Thus, a tunable light source is required in the prior art, so as to add a signal from another network device to an arbitrary wavelength channel in the optical network, resulting in an increase in cost of the optical add/drop device.

SUMMARY OF THE INVENTION

It is therefore an object of the present invention to provide an optical add/drop device which can increase a transmission distance between nodes to thereby allow long-haul transmission.

It is another object of the present invention to provide a low-cost optical add/drop device which can eliminate the need for a tunable wavelength converter including a tunable light source at an interface between this device and another network device. Other objects of the present invention will become apparent from the following description.

In accordance with a first aspect of the present invention, there is provided an optical add/drop device comprising an optical demultiplexer for separating WDM signal light into n (n is an integer satisfying 1<n) optical signals having different wavelengths, said WDM signal light being obtained by wavelength division multiplexing said n optical signals; n first optical switches each having first and second input ports and first and second output ports, said n optical signals output from said optical demultiplexer being supplied to said first input ports of said n first optical switches, respectively; a second optical switch having k (k is a natural number) input ports and n output ports, an optical signal to be added being supplied to at least one of said k input ports of said second optical switch, said n output ports of said second optical switch being connected to said second input ports of said n first optical switches, respectively; n regenerators connected to said first output ports of said n first optical switches, respectively; an optical multiplexer for wavelength division multiplexing optical signals output from said n regenerators; and a third optical switch having n input ports and k output ports, said n input ports of said third optical switch being connected to said second output ports of said n first optical switches, respectively, an optical signal to be dropped being output from at least one of said k output ports of said third optical switch.

As each regenerator, a wavelength converter or an opto/electro/optical converter may be used.

In accordance with a second aspect of the present invention, there is provided an optical add/drop device comprising an optical demultiplexer for separating WDM signal light into n (n is an integer satisfying 1<n) optical signals having different wavelengths, said WDM signal light being obtained by wavelength division multiplexing said n optical signals; n optical switches each having first and second input ports and first and second output ports, said n optical signals output from said optical demultiplexer being supplied to said first input ports of said n optical switches, respectively; a first electrical switch having k (k is a natural number) input ports, s (s is a natural number) input ports, and n output ports; k first opto/electrical converters connected to said k input ports of said first electrical switch, respectively; n first electro/optical converters for connecting said n output ports of said first electrical switch and said second input ports of said n optical switches, respectively; an optical multiplexer for wavelength division multiplexing optical signals output from said first output ports of said n optical switches; a second electrical switch having n input ports, k output ports, and s output ports; n second opto/electrical converters for connecting said n input ports of said second electrical switch and said second output ports of said n optical switches, respectively; k second electro/optical converters connected to said k output ports of said second electrical switch, respectively; and s electrical links for connecting said s input ports of said first electrical switch and said s output ports of said second electrical switch, respectively.

In accordance with a third aspect of the present invention, there is provided an optical add/drop device comprising an optical demultiplexer for separating WDM signal light into n (n is an integer satisfying 1<n) optical signals having different wavelengths, said WDM signal light being obtained by wavelength division multiplexing said n optical signals; n optical switches each having first and second input ports and first and second output ports, said n optical signals output from said optical demultiplexer being supplied to said first input ports of said n optical switches, respectively; a first electrical switch having k (k is a natural number) input ports, s (s is a natural number) input ports, and n output ports; (k+s) first opto/electrical converters connected to said (k+s) input ports of said first electrical switch, respectively; n first electro/optical converters for connecting said n output ports of said first electrical switch and said second input ports of said n optical switches, respectively; an optical multiplexer for wavelength division multiplexing optical signals output from said first output ports of said n optical switches; a second electrical switch having n input ports, k output ports, and s output ports; n second opto/electrical converters for connecting said n input ports of said second electrical switch and said second output ports of said n optical switches, respectively; (k+s) second electro/optical converters connected to said (k+s) output ports of said second electrical switch, respectively; and s optical links for connecting said first opto/electrical converters respectively corresponding to said s input ports of said first electrical switch and said second electro/optical converters respectively corresponding to said s output ports of said second electrical switch, respectively.

In accordance with a fourth aspect of the present invention, there is provided an optical add/drop device adapted to first and second optical paths. This device comprises first and second optical add/drop units connected to said first and second optical paths, respectively; an add switch for selectively adding an optical signal to any one of said first and second optical add/drop units; and a drop switch for selectively dropping an optical signal from any one of said first and second optical add/drop units. Each of said first and second optical add/drop units comprises an optical demultiplexer for separating WDM signal light into n (n is an integer satisfying 1<n) optical signals having different wavelengths, said WDM signal light being obtained by wavelength division multiplexing said n optical signals; n optical switches each having first and second input ports and first and second output ports, said n optical signals output from said optical demultiplexer being supplied to said first input ports of said n optical switches, respectively; n regenerators connected to said first output ports of said n optical switches, respectively; and an optical multiplexer for wavelength division multiplexing optical signals output from said n regenerators. The add switch is connected to said second input ports of said n optical switches, and the drop switch is connected to said second output ports of said n optical switches.

In accordance with a fifth aspect of the present invention, there is provided an optical add/drop device comprising an optical switch for adding and dropping optical signals having different wavelengths, and a regenerator provided on the output side of said optical switch for converting an arbitrary wavelength into a specific wavelength, wherein the waveform shaping of an optical signal passed through said optical switch without dropping and the wavelength conversion of an arbitrary wavelength of an optical signal added into a specific wavelength are performed.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail.

Figure 4:
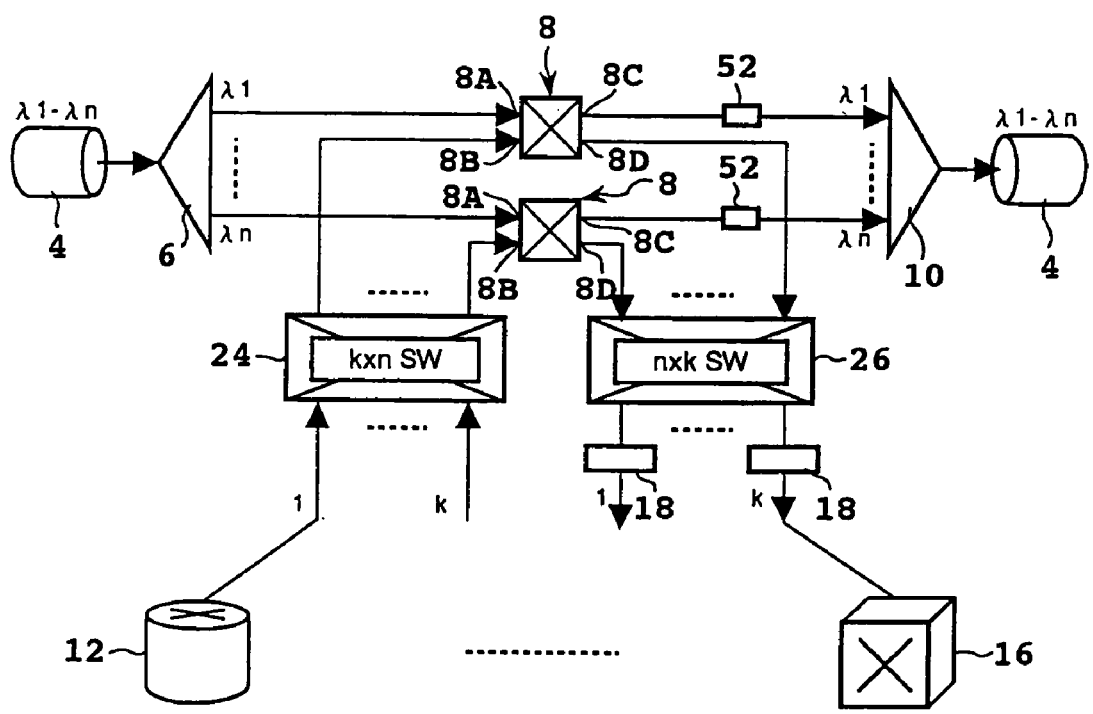
FIG. 4 is a block diagram showing a first preferred embodiment of the optical add/drop device according to the present invention.

FIG. 4 is a block diagram showing a first preferred embodiment of the optical add/drop device according to the present invention. In this preferred embodiment, a so-called DOADM (dynamic optical add/drop multiplexer) is used as the optical add/drop device. The optical add/drop device is arranged along an optical transmission line (generally, an optical fiber transmission line) 4 for transmitting WDM signal light obtained by wavelength division multiplexing a plurality of optical signals having different wavelengths $\lambda 1$ to $\lambda n$ (n is an integer satisfying 1<n). The optical add/drop device includes an optical demultiplexer 6 for separating the WDM signal light supplied from the input-side optical transmission line 4 into the optical signals of the wavelengths $\lambda 1$ to $\lambda n$, n optical switches 8 for selecting optical signals to be passed through this optical add/drop device and optical signals to be added/dropped, an optical multiplexer 10 for wavelength division multiplexing optical signals to be output to the output-side optical transmission line 4, an optical switch 24 for adding an optical signal, and an optical switch 26 for dropping an optical signal.

Each optical switch 8 has two input ports 8A and 8B and two output ports 8C and 8D. The optical signals of the wavelengths $\lambda 1$ to $\lambda n$ output from the optical demultiplexer 6 are supplied to the input ports 8A of the n optical switches 8, respectively. Each optical switch 8 may be provided by a 2×2 optical switch for switching between a bar state and a cross state between the input ports 8A and 8B and the output ports 8C and 8D.

The optical switch 24 has k (k is a natural number) input ports and n output ports. At least one of the k input ports of the optical switch 24 is supplied with an optical signal from another network device for an add signal, such as a router 12. The n output ports of the optical switch 24 are connected to the input ports 8B of the n optical switches 8, respectively.

n regenerators 52 are connected to the output ports 8C of the n optical switches 8, respectively. The outputs of the n regenerators 52 are connected to the n input ports of the optical multiplexer 10.

The optical switch 26 has n input ports and k output ports. The n input ports of the optical switch 26 are connected to the output ports 8D of the n optical switches 8, respectively, and an optical signal to be dropped is output from at least one of the k output ports of the optical switch 26. In this preferred embodiment, k regenerators 18 as wavelength converters are connected to the k output ports of the optical switch 26, respectively. The wavelength of the optical signal output from at least one of the k output ports of the optical switch 26 is converted into a desired wavelength by the corresponding regenerator 18, and the wavelength-converted optical signal is next supplied to another network device for a drop signal, such as an ATM switch 16.

The optical switches 24 and 26 may be provided by a k×n optical switch and an n×k optical switch, respectively.

The case of adding a desired optical signal having an arbitrary wavelength to the WDM signal light will now be described. The optical signal from the router 12, for example, is routed to the output port of the optical switch 24 connected to the optical switch 8 corresponding to the desired wavelength, by setting the optical switch 24. This optical switch 8 is preliminarily controlled to have the cross state, so that the added optical signal is supplied to the corresponding regenerator 52 to convert the wavelength of the added optical signal into a desired wavelength. Then, the added optical signal is output through the optical multiplexer 10 to the output-side optical transmission line 4.

The case of dropping an optical signal having a desired wavelength from the WDM signal light will now be described. The WDM signal light supplied from the input-side optical transmission line 4 is separated into a plurality of optical signals having different wavelengths by the optical demultiplexer 6. The optical switch 8 corresponding to the wavelength of the optical signal to be dropped is preliminarily controlled to have the cross state. The optical signal dropped is routed to the desired output port of the optical switch 26 by setting the optical switch 26, and the wavelength of the dropped optical signal is converted into the wavelength of an intraoffice interface signal, for example, by the corresponding regenerator 18. Thereafter, the wavelength-converted optical signal is supplied to another network device such as an ATM switch 16. As the wavelength of the intraoffice interface signal, a wavelength in a 1.3 µm band, for example, may be used. As the wavelength of each channel of the WDM signal light, a wavelength in a 1.55 µm band, for example, may be used.

On the other hand, the optical signals passing through this optical add/drop device are subjected to wavelength conversion by the regenerators 52 by controlling the optical switches 8 so that they have the bar state. The wavelength-converted optical signals from the regenerators 52 are output through the optical multiplexer 10 to the output-side optical transmission line 4.

According to this preferred embodiment, the regenerators 52 corresponding to the wavelengths of the optical signals to be passed are provided between the optical switches 8 and the optical multiplexer 10. Accordingly, all of the optical signals passing through this optical add/drop device and the optical signal added can be easily subjected to signal processing such as waveform shaping. As a result, a transmission distance between optical add/drop devices can be greatly increased.

Further, the outputs of the regenerators 52 are preliminarily assigned to the wavelengths of the WDM signal light. Accordingly, an optical signal from another network device such as a router and an ATM switch can be easily added to an arbitrary wavelength channel of the WDM signal light without the need for use of wavelength converters each including a tunable light source complicated in configuration as in the prior art.

Particularly in this preferred embodiment, the regenerators 18 are connected to the output ports of the optical switch 26 for dropping an optical signal. Accordingly, the wavelength of the optical signal dropped can be easily made to coincide with the wavelength of an intraoffice interface signal.

Figure 5:
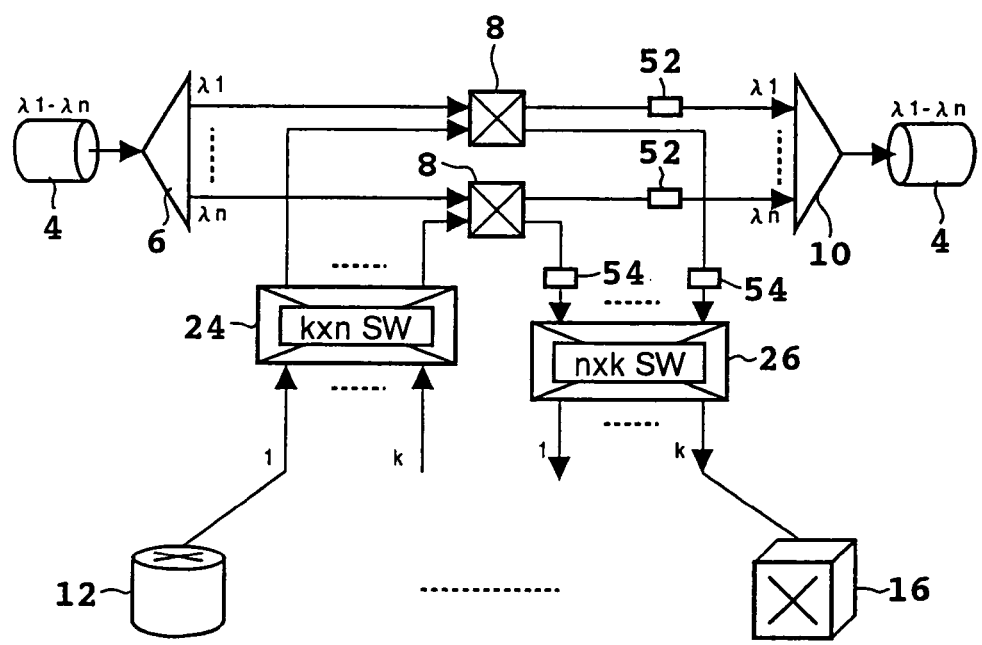
FIG. 5 is a block diagram showing a second preferred embodiment of the optical add/drop device according to the present invention.

FIG. 5 is a block diagram showing a second preferred embodiment of the optical add/drop device (DOADM) according to the present invention. In contrast to the configuration shown in FIG. 4, the second preferred embodiment is characterized by n regenerators (wavelength converters) 54 provided on the input side of the optical switch 26 in place of the regenerators 18 provided on the output side of the optical switch 26. The n regenerators 54 are provided between the n input ports of the optical switch 26 and the n optical switches 8, respectively.

The add operation and the through operation of the second preferred embodiment shown in FIG. 5 are the same as those of the first preferred embodiment shown in FIG. 4, so the drop operation will be described herein. A plurality of optical signals separated by the optical demultiplexer 6 are supplied to the n optical switches 8, respectively. The optical switch 8 corresponding to the wavelength of an optical signal to be dropped is controlled to have the cross state. The wavelength of the dropped optical signal is converted into the wavelength of an intraoffice interface signal, for example, by the corresponding regenerator 54 before this optical signal is supplied to the optical switch 26. Then, this optical signal is routed to an arbitrary port by the optical switch 26, and is next supplied to another network device such as an ATM switch 16.

Accordingly, this preferred embodiment can exhibit the effect obtained by the preferred embodiment shown in FIG. 4 and can further increase the transmission distance between optical add/drop devices because the regenerators 54 are provided on the input side of the optical switch 26.

Figure 6:
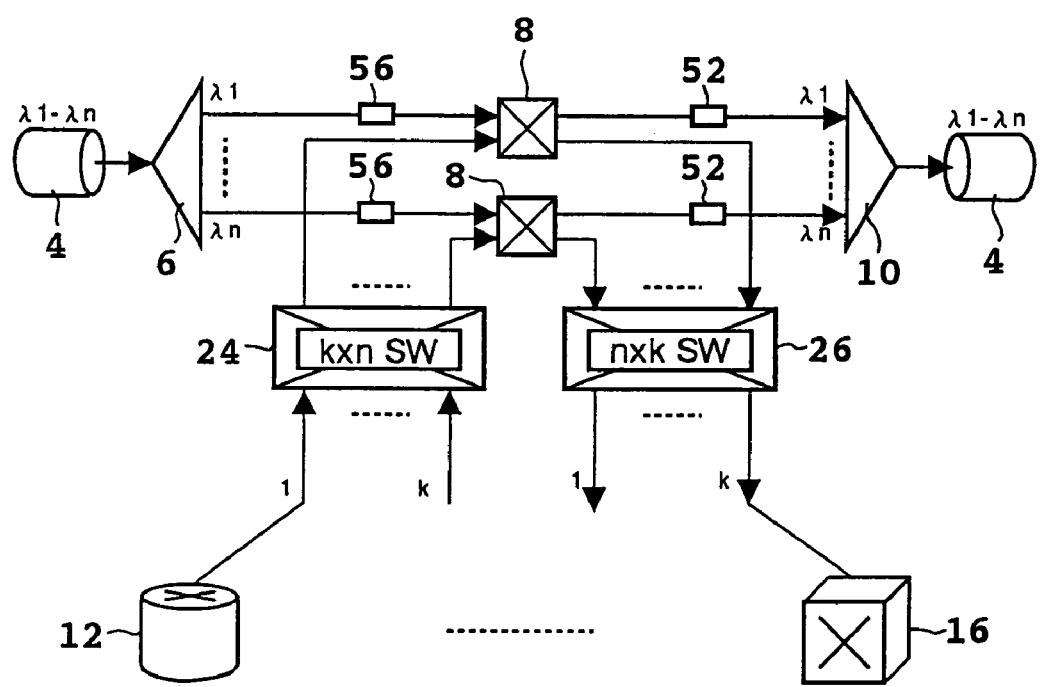
FIG. 6 is a block diagram showing a third preferred embodiment of the optical add/drop device according to the present invention.

FIG. 6 is a block diagram showing a third preferred embodiment of the optical add/drop device (DOADM) according to the present invention. In contrast to the configuration shown in FIG. 4, the third preferred embodiment is characterized by n regenerators (wavelength converters) 56 provided on the input side of the n optical switches 8 in place of the regenerators 18 provided on the output side of the optical switch 26. The n regenerators 56 are provided between the n output ports of the optical demultiplexer 6 and the n optical switches 8, respectively.

The add operation and the through operation of the third preferred embodiment shown in FIG. 6 are the same as those of the first preferred embodiment shown in FIG. 4, so the drop operation will be described herein. The wavelengths of a plurality of optical signals separated by the optical demultiplexer 6 are converted into the wavelength of an intraoffice interface signal, for example, by the regenerators 56, and the wavelength-converted optical signals are next supplied to the optical switches 8. The optical switch 8 corresponding to the wavelength of an optical signal to be dropped is controlled to have the cross state. Then, the dropped optical signal is routed to an arbitrary port by the optical switch 26, and is next supplied to another network device such as an ATM switch 16.

Accordingly, this preferred embodiment can exhibit the effect obtained by the preferred embodiment shown in FIG. 4 and can further increase the transmission distance between optical add/drop devices because the regenerators 56 are provided on the input side of the optical switches 8.

Figure 7:
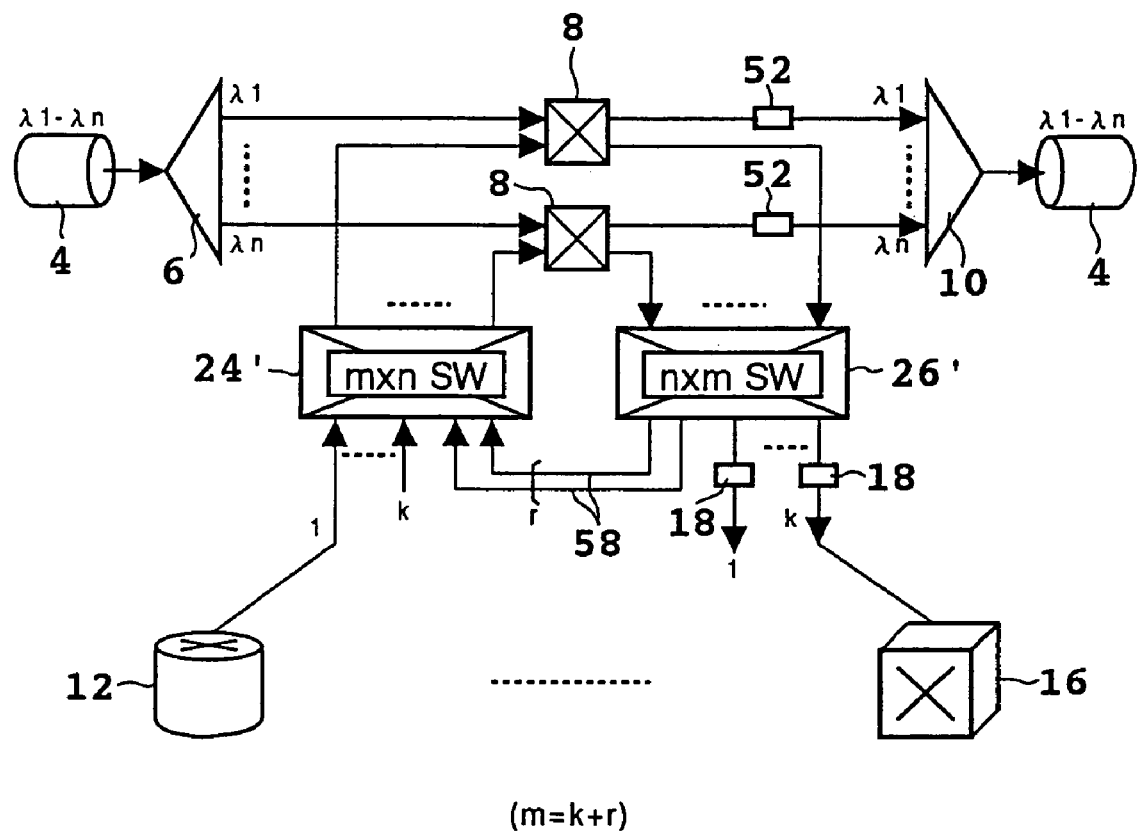
FIG. 7 is a block diagram showing a fourth preferred embodiment of the optical add/drop device according to the present invention.

FIG. 7 is a block diagram showing a fourth preferred embodiment of the optical add/drop device (DOADM) according to the present invention. In this preferred embodiment, optical switches 24' and 26' are used in place of the optical switches 24 and 26 shown in FIG. 4, respectively. An m×n optical switch is used as the optical switch 24', and an n×m optical switch is used as the optical switch 26', where m is an integer satisfying m=k+r (r is a natural number). Accordingly, the optical switch 24' has additional r input ports as compared with the optical switch 24, and the optical switch 26' has additional r output ports as compared with the optical switch 26. The remaining r input ports of the optical switch 24' and the remaining r output ports of the optical switch 26' are connected by r links 58, respectively. Each link 58 may be provided by an optical fiber link. The number r of links 58 may be equal to or less than the number n of channels of the WDM signal light.

According to the preferred embodiment shown in FIG. 7, wavelength conversion can be applied to the optical signals passing through the optical add/drop device, thereby allowing the construction or operation of a flexible optical network. This will now be described more specifically.

Figure 8:
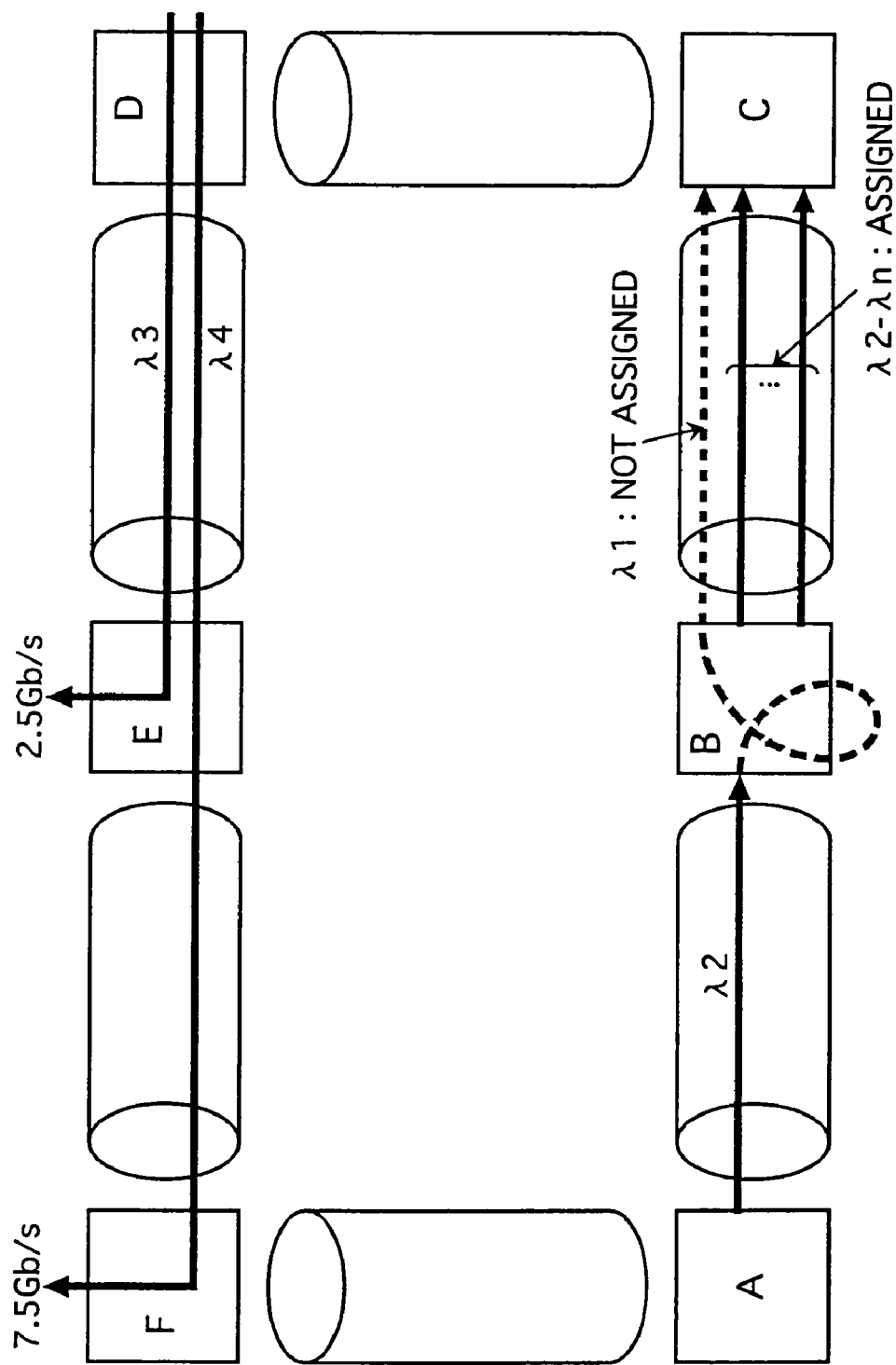
FIG. 8 is a block diagram showing an optical network system to which the present invention is applicable.

FIG. 8 shows an optical network system to which the present invention is applicable. Reference symbols A to F denote nodes, and the optical add/drop device according to the present invention is applicable to each node. These nodes are connected by an optical transmission line.

It is assumed that optical signals are transmitted between the node B and the node C by using all of the wavelengths $\lambda 2$ to $\lambda n$. When an optical signal having the wavelength $\lambda 2$ is transmitted from the node A to the node B, this optical signal cannot be transmitted at the wavelength $\lambda 2$ from the node B to the node C, and it is therefore necessary to perform the wavelength conversion from the wavelength $\lambda 2$ of the optical signal to the remaining wavelength $\lambda 1$. That is, wavelength conversion must be applied to the optical signal passing through the node B.

According to the preferred embodiment shown in FIG. 7, the above requirement can be easily met. The WDM signal light supplied from the input-side optical transmission line 4 is separated into a plurality of optical signals by the optical demultiplexer 6, and these optical signals having different wavelengths are supplied to the optical switches 8, respectively. The optical switch 8 corresponding to the wavelength to be converted is preliminarily controlled to have the cross state, so that this optical signal is supplied through the optical switch 26' for dropping to any one of the r links 58, and is next input into the optical switch 24' for adding. In the optical switch 24', the input optical signal is routed to the port connected to the optical switch 8 corresponding to a desired wavelength. This optical switch 8 is preliminarily controlled to have the cross state, so that the optical signal added is passed through the optical switch 8 and next subjected to wavelength conversion by the corresponding regenerator 52. Finally, this wavelength-converted optical signal is output at the desired wavelength to the output-side optical transmission line 4.

According to the preferred embodiment shown in FIG. 7, it is possible to prevent a reduction in utilization efficiency of a network due to no wavelength conversion in an optical add/drop device.

Figure 9:
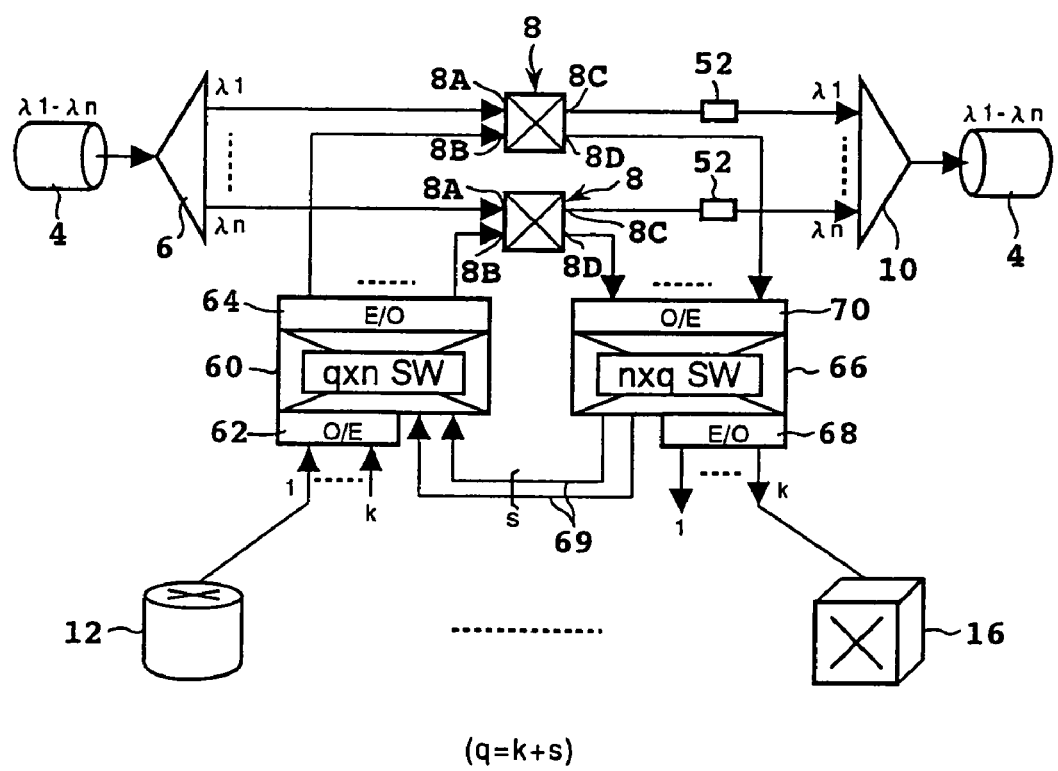
FIG. 9 is a block diagram showing a fifth preferred embodiment of the optical add/drop device according to the present invention.

FIG. 9 is a block diagram showing a fifth preferred embodiment of the optical add/drop device (DOADM) according to the present invention. As similar to the previous preferred embodiments, the fifth preferred embodiment employs an optical demultiplexer 6, n optical switches 8, and an optical multiplexer 10. Further, these elements 6, 8, and 10 are connected in a similar manner. In this preferred embodiment, electrical switches 60 and 66 are used to provide processing of the optical signals passing through the optical add/drop device by electrical path as a unit.

The electrical switch 60 has q input ports and n output ports, where q is an integer satisfying q=k+s (s is a natural number). Accordingly, a q×n electrical switch may be used as the electrical switch 60.

k opto/electrical (O/E) converters 62 are connected to the k input ports of the electrical switch 60, respectively. Each opto/electrical converter 62 is provided for an intraoffice interface between this optical add/drop device and another network device such as a router 12, for example.

n electro/optical (E/O) converters 64 are connected to the n output ports of the electrical switch 60, respectively. The n electro/optical converters 64 are connected to the input ports 8B of the n optical switches 8, respectively.

The electrical switch 66 has n input ports and q output ports. Accordingly, an n×q electrical switch may be used as the electrical switch 66. n opto/electrical converters 70 are connected to the n input ports of the electrical switch 66, respectively. The n opto/electrical converters 70 are connected to the output ports 8D of the n optical switches 8, respectively. k electro/optical converters 68 are connected to the k output ports of the electrical switch 66, respectively. Each electro/optical converter 68 is connected to another network device such as an ATM switch 16.

The remaining s output ports of the electrical switch 66 and the remaining s input ports of the electrical switch 60 are connected by s links 69, respectively. Each s link 69 is provided by an electrical link.

Figure 10:
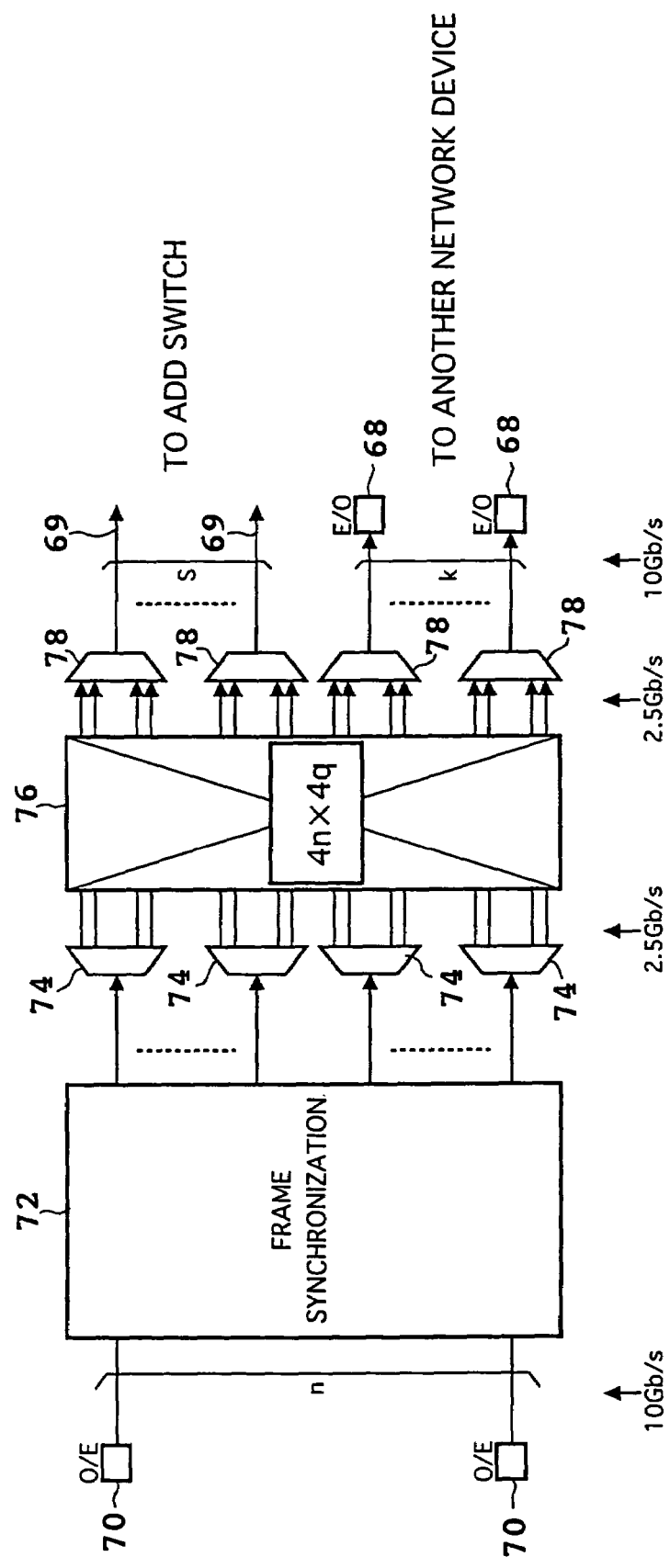
FIG. 10 is a block diagram showing a specific configuration of an electrical switch for dropping shown in FIG. 9.

Referring to FIG. 10, there is shown a specific configuration of the electrical switch 66 shown in FIG. 9. The electrical switch 66 includes a frame synchronizing circuit 72 connected to the n opto/electrical converters 70, n frame demultiplexing circuits 74 connected to the frame synchronizing circuit 72, q frame multiplexing circuits 78, and an electrical matrix switch 76 connected between the frame synchronizing circuits 74 and the frame multiplexing circuits 78. In the case that the number of frames to be multiplexed is 4, a 4n×4q switch may be used as the electrical matrix switch 76. The s frame multiplexing circuits 78 of the q frame multiplexing circuits 78 are connected through the s links 69 to the electrical switch 60 for adding, and the remaining k frame multiplexing circuits 78 are connected through the k electro/optical converters 68 to the other network device 16 (see FIG. 9).

According to this preferred embodiment, for example, of 10 Gb/s (Oc-192 in SONET) assigned to one wavelength, 7.5 Gb/s (Oc-48 of three channels) may be passed through the optical add/drop device, and 2.5 Gb/s (Oc-48 of one channel) may be dropped from the optical add/drop device. This will now be described more specifically.

In the optical add/drop device shown in FIG. 9, the WDM signal light supplied from the input-side optical transmission line 4 to the optical demultiplexer 6 is separated into a plurality of optical signals having wavelengths $\lambda 1$ to $\lambda n$, and these n optical signals are next input into the n optical switches 8, respectively. The optical switch 8 corresponding to the wavelength of an optical signal required to be processed by electrical path as a unit is preliminarily controlled to have the cross state. Accordingly, this optical signal is dropped in this optical switch 8, and is next converted into an electrical signal by the corresponding opto/electrical converter 70. This electrical signal is next input into the electrical switch 66.

An Oc-192 signal (10 Gb/s) as the electrical signal is subjected to frame synchronization by the frame synchronizing circuit 72 shown in FIG. 10, and next separated into Oc-48 signals (2.5 Gb/s for each) of four channels by the corresponding frame demultiplexing circuit 74. In the electrical matrix switch 76, these Oc-48 signals are routed to desired paths by Oc-48 signal as a unit. These routed signals are next multiplexed by the corresponding frame multiplexing circuit 78 to obtain an Oc-192 signal again, which is in turn converted into an optical signal by the corresponding electro/optical converter 68. The signal having 7.5 Gb/s (Oc-48 of three channels) to be passed through the optical add/drop device is routed to the port connected to the electrical switch 60 by the corresponding link 69, and the drop signal having 2.5 Gb/s (Oc-48) is routed to the intraoffice interface. The signal to be passed is next routed by the electrical switch 60 to return to the original optical switch 8. Since this optical switch 8 is controlled to have the cross state as mentioned above, the returned signal is added at the original wavelength to the WDM signal light, and then output to the output-side optical transmission line 4.

The advantage of this operation over the prior art will now be described with reference to FIG. 8. In the case that a signal of 10 Gb/s is transmitted from the node D to the node E, for example, there is a case that a signal of 2.5 Gb/s is desired to be dropped at the node E and the remaining signal of 7.5 Gb/s is desired to be dropped at the node F. In the prior art, such an operation requires the use of two wavelengths (λ3 and λ4 in FIG. 8) between the node D and the node E. To the contrary, the preferred embodiment shown in FIGS. 9 and 10 has an advantage that the use of one wavelength is sufficient for the transmission between the node D and the node E because the processing by electrical path as a unit is allowed. Accordingly, it is possible to prevent a reduction in utilization efficiency of a network due to the processing by wavelength as a unit within an optical network.

Figure 11:
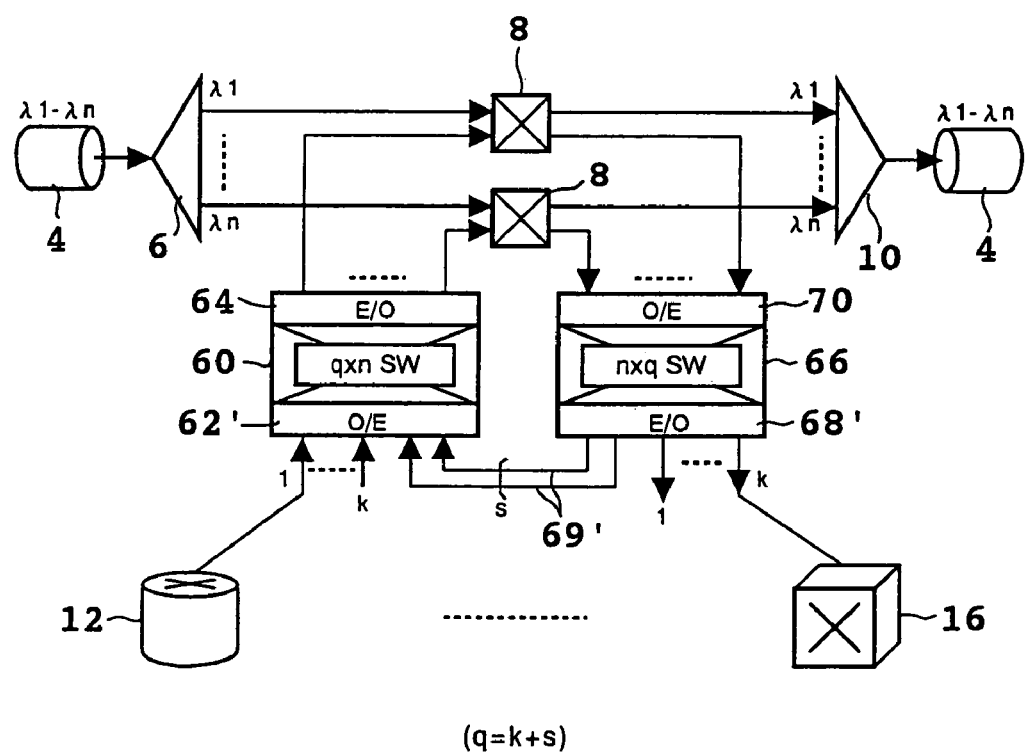
FIG. 11 is a block diagram showing a sixth preferred embodiment of the optical add/drop device according to the present invention.

FIG. 11 is a block diagram showing a sixth preferred embodiment of the optical add/drop device (DOADM) according to the present invention. This preferred embodiment will now be described in contrast to the preferred embodiment shown in FIG. 9. The k opto/electrical converters 62 provided on the input side of the electrical switch 60 for adding are modified to q (q=k+s) opto/electrical converters 62'. The k electro/optical converters 68 provided on the output side of the electrical switch 66 for dropping are modified to q electro/optical converters 68'. Further, the s links 69 for electrical signals are modified to s links 69' provided by optical links.

According to this preferred embodiment, the effect obtained by the preferred embodiment shown in FIGS. 9 and 10 can be obtained. Additionally, even when the electrical switch 60 for adding and the electrical switch 66 for dropping are placed apart from each other, these switches can be easily connected by the optical links.

Figure 12A:
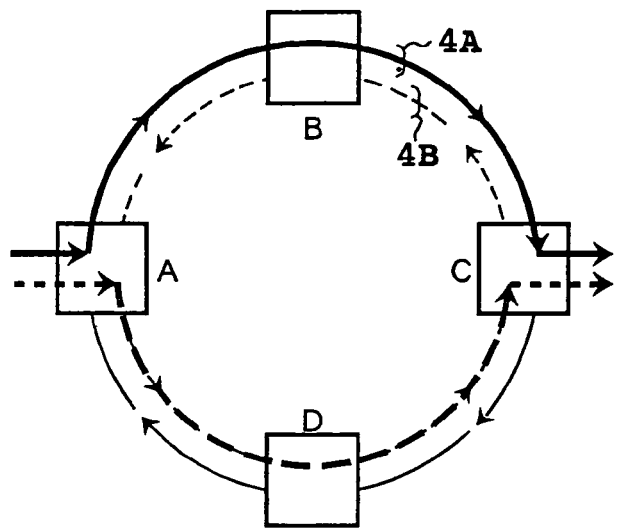
FIGS. 12A and 12B are schematic diagrams for illustrating an example of the operation of a 2F-UPSR (unidirectional path switched ring using two fibers) to which the present invention is applicable.
Figure 12B:
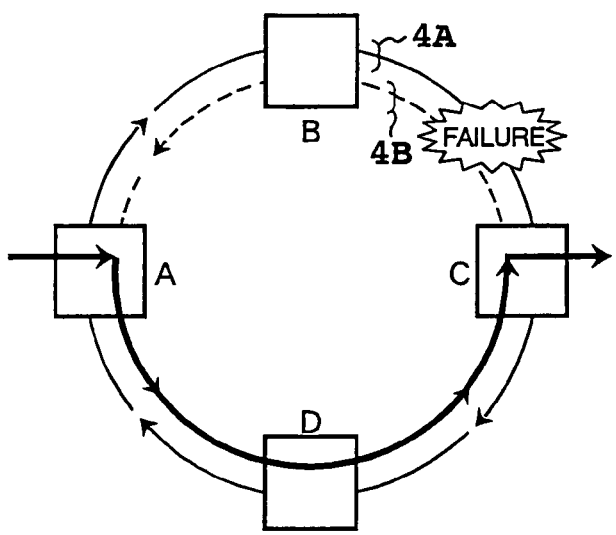

FIGS. 12A and 12B show an example of the operation of a 2F-UPSR (unidirectional path switched ring using two fibers) to which the present invention is applicable. Nodes A to D each including the optical add/drop device according to the present invention are connected by a main fiber 4A and a standby fiber 4B so as to form a ring. The main fiber 4A transmits WDM signal light in a clockwise direction, and the standby fiber 4B transmits WDM signal light in a counterclockwise direction.

In a normal operation shown in FIG. 12A, the main fiber 4A is used to form a main traffic leading from the node A through the node B to the node C. Further, the standby fiber 4B is used to form a low-priority traffic leading from the node A through the node D to the node C. In case of failure, the low-priority traffic may be cut for the main traffic.

When a failure such as a fiber break occurs between the node B and the node C, for example, as shown in FIG. 12B, an operation system managing the whole of a network detects this failure, and switches from the main fiber 4A to the standby fiber 4B at the transmitting node A. At the same time, the operation system switches from the main fiber 4A to the standby fiber 4B at the receiving node C. In this case, the low-priority traffic is cut.

Figure 13:
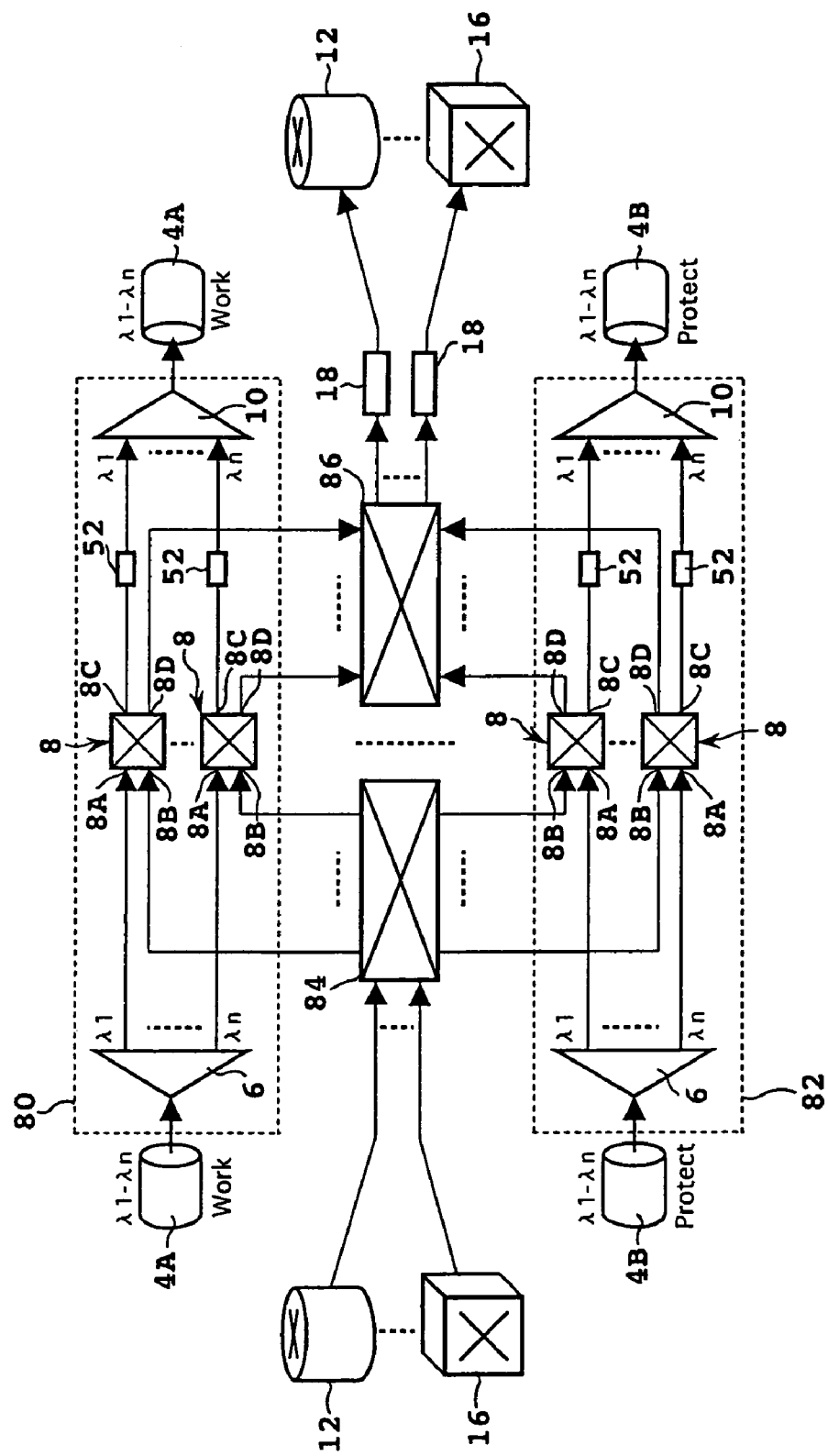
FIG. 13 is a block diagram showing a seventh preferred embodiment of the optical add/drop device according to the present invention.

FIG. 13 is a block diagram showing a seventh preferred embodiment of the optical add/drop device (DOADM) according to the present invention. This preferred embodiment is applicable to the 2F-UPSR shown in FIGS. 12A and 12B. This optical add/drop device includes a WDM ring section (corresponding to the first optical add/drop unit) 80 of a main system (Work) inserted in the main fiber 4A, a WDM ring section (corresponding to the second optical add/drop unit) 82 of a standby system (Protect) inserted in the standby fiber 4B, and an add switch 84 and a drop switch 86 both connected between the WDM ring sections 80 and 82.

Each of the WDM ring sections 80 and 82 includes the optical demultiplexer 6, the n optical switches 8, the n wavelength converters 52, and the optical multiplexer 10 shown in FIG. 4, for example. The add switch 84 is connected to another network device such as a router 12 and an ATM switch 16 for outputting an optical signal to be added, and the drop switch 86 is connected to another network device such as a router 12 and an ATM switch 16 for receiving an optical signal to be dropped.

The add switch 84 is connected to the second input ports 8B of the n optical switches 8 in each of the WDM ring sections 80 and 82, and the drop switch 86 is connected to the second output ports 8D of the n optical switches 8 in each of the WDM ring sections 80 and 82.

Figure 14A:
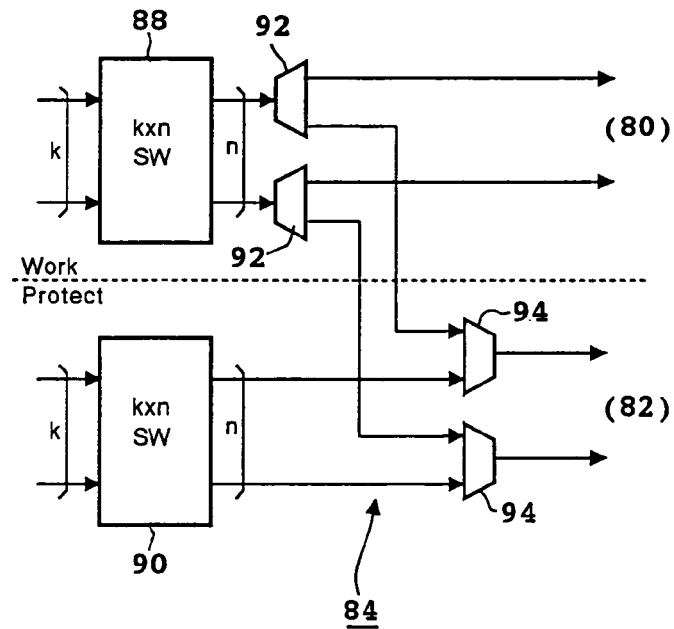
FIGS. 14A and 14B are block diagrams showing preferred embodiments of an add switch and a drop switch shown in FIG. 13, respectively.
Figure 14B:
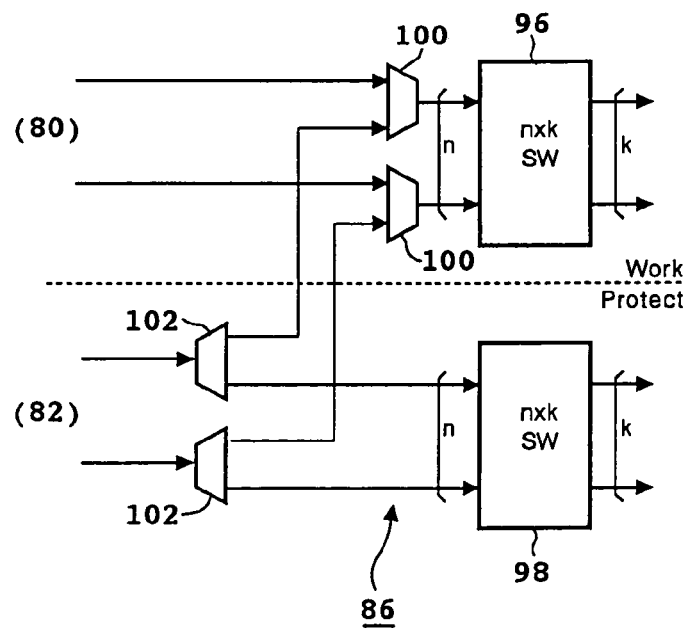

FIG. 14A is a block diagram showing a preferred embodiment of the add switch 84 shown in FIG. 13, and FIG. 14B is a block diagram showing a preferred embodiment of the drop switch 86 shown in FIG. 13. The add switch 84 includes two k×n optical switches 88 and 90, and n 1×2 optical switches 92 and n 2×1 optical switches 94 for switching the outputs from the optical switches 88 and 90. Further, the drop switch 86 includes two n×k optical switches 96 and 98, and n 2×1 optical switches 100 and n 1×2 optical switches 102 for switching the inputs to the optical switches 96 and 98.

The operation of the add switch 84 will now be described with reference to FIG. 14A. In the main system, an optical signal from another network device selected by the k×n optical switch 88 is normally switched to the main fiber 80 by the corresponding 1×2 optical switch 92, whereas in case of failure, the optical signal is switched to the standby fiber 82 by the corresponding 1×2 optical switch 92. In the standby system, an optical signal from another network device selected by the k×n optical switch 90 is normally output through the corresponding 2×1 optical switch 94 to the standby fiber 82, whereas in case of failure, an optical signal from another network device selected by the k×n optical switch 88 is output through the corresponding 1×2 optical switch 92 and the corresponding 2×1 optical switch 94 to the standby fiber 82.

The operation of the drop switch 86 will now be described with reference to FIG. 14B. In the main system, each 2×1 optical switch 100 normally selects an output from the main fiber 80, whereas in case of failure, each 2×1 optical switch 100 selects an output from the standby fiber 82. Then, the selected output is supplied to another network device selected by the n×k optical switch 96. In the standby system, each 1×2 optical switch 102 normally supplies an optical signal from the standby fiber 82 to another network device selected by the n×k optical switch 98, whereas in case of failure, each 1×2 optical switch 102 supplies this optical signal to another network device selected by the n×k optical switch 96.

In any case, the k×n optical switches 88 and 90 control so that the wavelength conversion to a desired wavelength in the ring is performed, and the n×k optical switches 96 and 98 control so that an optical signal is output to a desired port.

Generally, the number k of ports for adding/dropping is smaller than the number n of wavelengths of the WDM signal light, so that (n−k) low-priority signals can be transmitted even in case of failure.

Figure 15A:
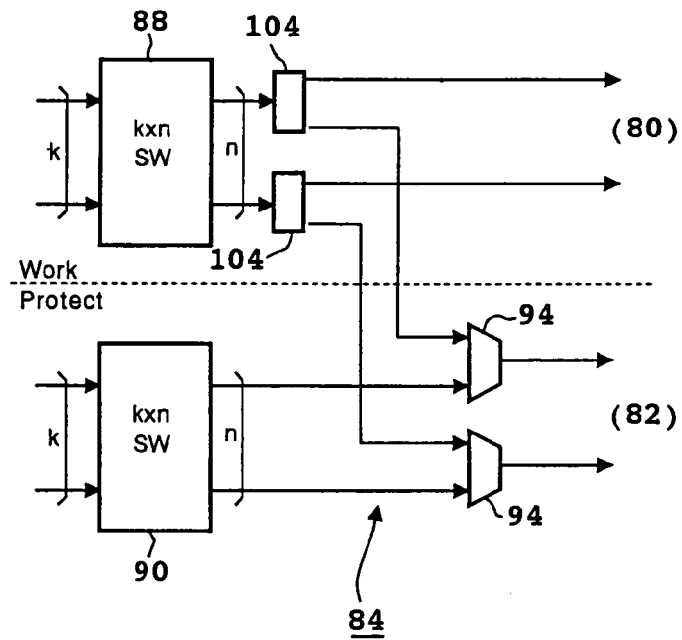
FIGS. 15A and 15B are block diagrams showing other preferred embodiments of the add switch and the drop switch shown in FIG. 13, respectively.
Figure 15B:
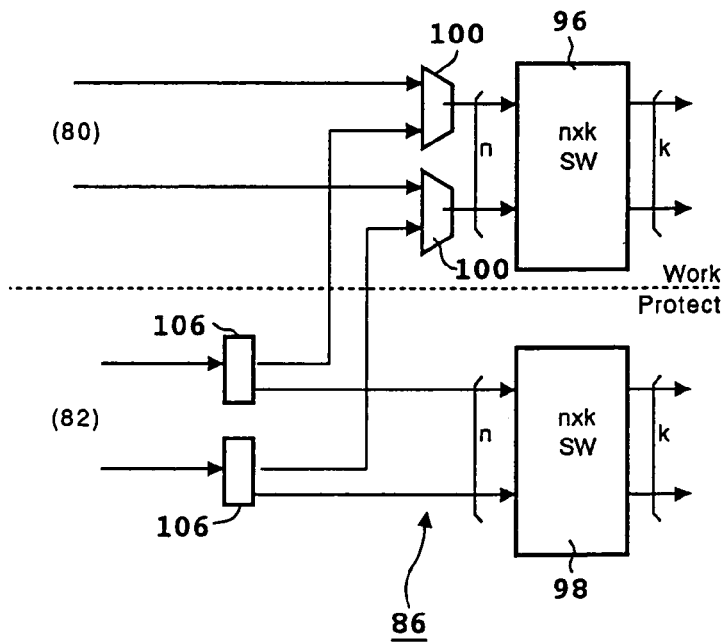

Referring to FIGS. 15A and 15B, there are shown other preferred embodiments of the add switch 84 and the drop switch 86 shown in FIG. 13, respectively. The preferred embodiment shown in FIG. 15A employs n 1×2 optical couplers 104 in place of the n 1×2 optical switches 92 shown in FIG. 14A. The preferred embodiment shown in FIG. 15B employs n 1×2 optical couplers 106 in place of the n 1×2 optical switches 102 shown in FIG. 14B. Also in these preferred embodiments, the switching in case of failure can be easily performed in the optical add/drop device in a similar manner.

Referring to FIGS. 16A and 16B and FIGS. 17A and 17B, there are shown examples of the operation of a 4F-BPSR (bidirectional path switched ring using four fibers) to which the present invention is applicable. Nodes A to D each including the optical add/drop device according to the present invention are connected by two main fibers 4A(#1) and 4A(#2) and two standby fibers 4B(#1) and 4B(#2) so as to form a ring. The main fiber 4A(#1) and the standby fiber 4B(#1) transmit WDM signal light in a counterclockwise direction, and the main fiber 4A(#2) and the standby fiber 4B(#2) transmit WDM signal light in a clockwise direction.

Figure 16A:
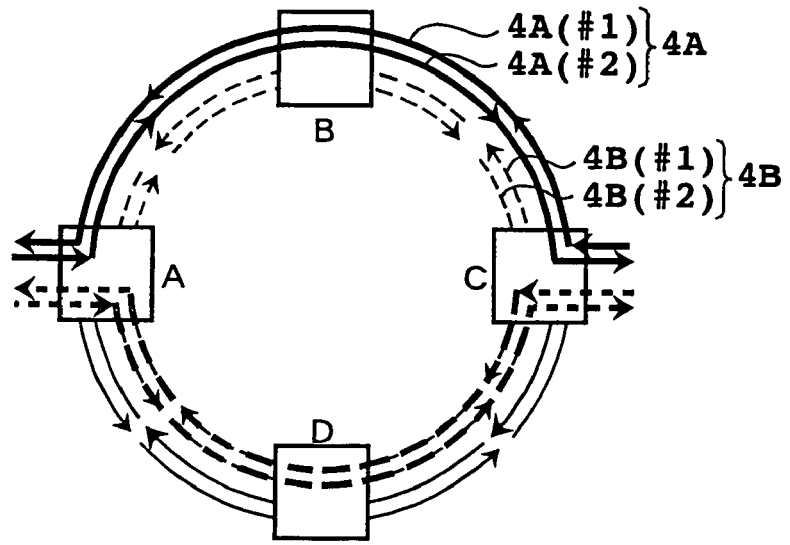
FIGS. 16A and 16B are schematic diagrams for illustrating an example of the operation of a 4F-BPSR (bidirectional path switched ring using four fibers) to which the present invention is applicable.
Figure 17A:
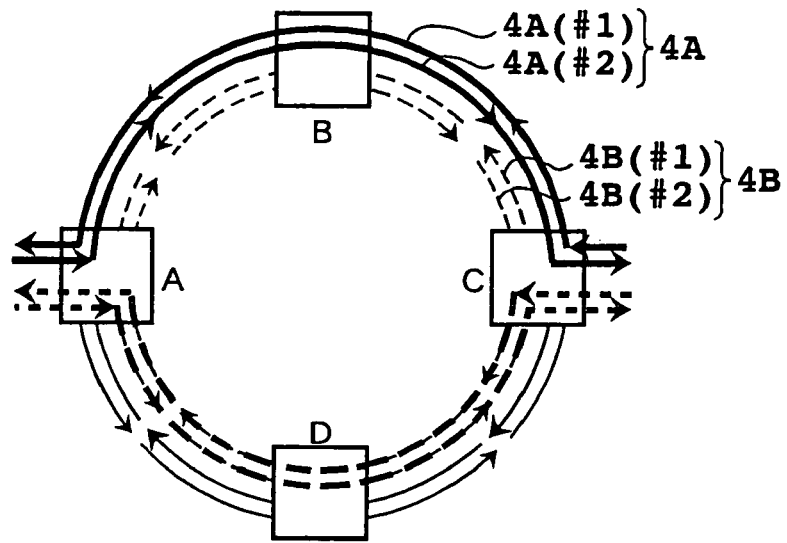
FIGS. 17A and 17B are schematic diagrams for illustrating another example of the operation of the 4F-BPSR.

In a normal operation shown in FIGS. 16A and 17A, the main fiber 4A(#1) is used to form a main traffic leading from the node C through the node B to the node A, and the main fiber 4A(#2) is also used to form another main traffic leading from the node A through the node B to the node C. Further, in the normal operation, the standby fiber 4B(#1) is used to form a low-priority traffic leading from the node A through the node D to the node C, and the standby fiber 4B(#2) is also used to form another low-priority traffic leading from the node C through the node D to the node A. In case of failure, a part or the whole of the low-priority traffic may be cut for the main traffic.

Figure 16B:
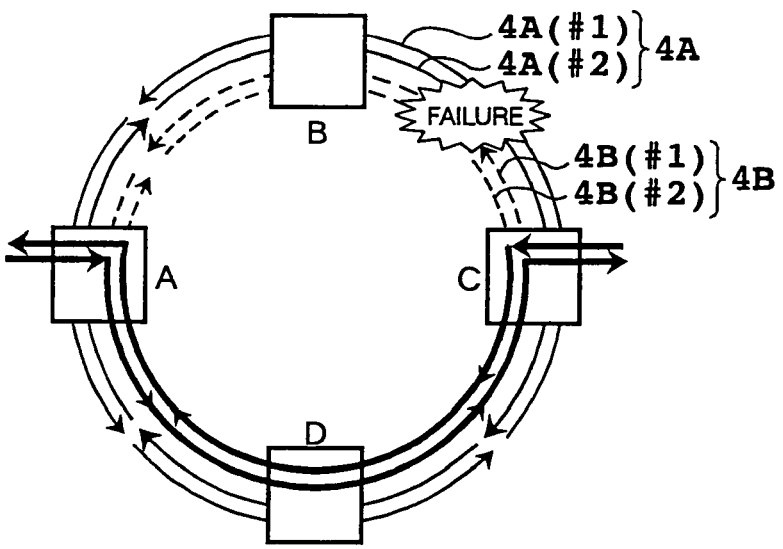

When a failure such that all the optical transmission lines are broken between the node B and the node C occurs, for example, as shown in FIG. 16B, an operation system managing the whole of a network detects this failure, and switches from the main fiber 4A(#1) to the standby fiber 4B(#2) whose transmission direction is opposite to that of the main fiber 4A(#1). Further, the operation system switches from the main fiber 4A(#2) to the standby fiber 4B(#1) whose transmission direction is opposite to that of the main fiber 4A((#2).

Figure 17B:
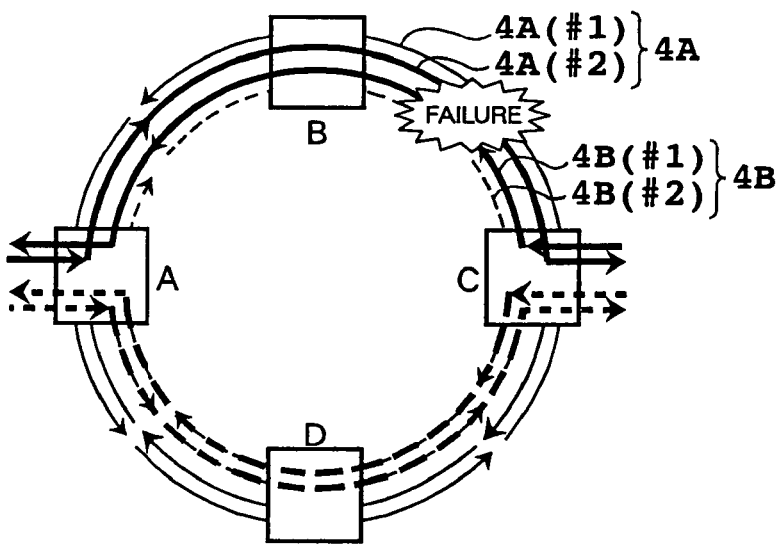

In the case that a failure occurs in only the main fiber 4A(#1) between the node B and the node C, for example, as shown in FIG. 17B, the main fiber 4A(#1) is switched to the standby fiber 4B(#1) whose transmission direction is the same as that of the main fiber 4A(#1).

Thus, it is required to design such a configuration that the main fiber 4A(#1) can be switched to the standby fiber 4B(#1) or 4B(#2) and that the main fiber 4A(32) can also be switched to the standby fiber 4B(#1) or 4B(#2).

Figure 18:
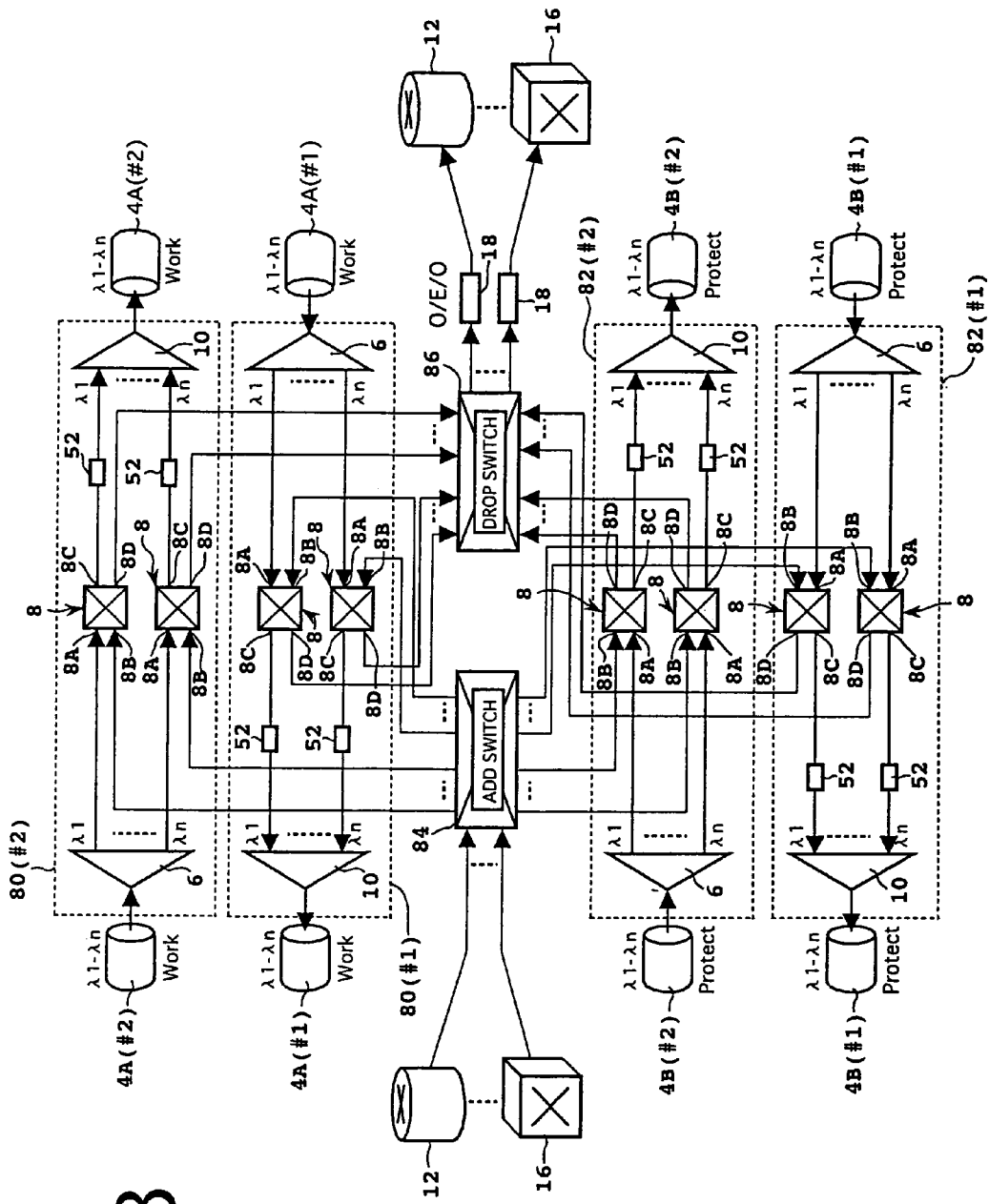
FIG. 18 is a block diagram showing an eighth preferred embodiment of the optical add/drop device according to the present invention.

FIG. 18 is a block diagram showing an eighth preferred embodiment of the optical add/drop device (DOADM) according to the present invention. This preferred embodiment is applicable to the 4F-BPSR shown in FIGS. 16A and 16B and FIGS. 17A and 17B. This optical add/drop device includes two WDM ring sections 80(#1) and 80(#2) of a main system inserted in the main fibers 4A(#1) and 4A(#2), respectively, two WDM ring sections 82(#1) and 82(#2) of a standby system inserted in the standby fibers 4B(#1) and 4B(#2), respectively, and an add switch 84 and a drop switch 86 both connected between the WDM ring sections 80(#1) and 80(#2) and the WDM ring sections 82(#1) and 82(#2).

Each of the WDM ring sections 80(#1), 80(#2), 82(#1), and 82(#2) includes the optical demultiplexer 6, the n optical switches 8, the n wavelength converters 52, and the optical multiplexer 10 shown in FIG. 4, for example. The add switch 84 is connected to another network device such as a router 12 and an ATM switch 16 for outputting an optical signal to be added, and via wavelength converter 18, the drop switch 86 is connected to another network device which receives an optical signal to be dropped to a router 12 and an ATM switch 16.

The add switch 84 is connected to the second input ports 8B of the n optical switches 8 in each of the WDM ring sections 80(#1), 80(#2), 82(#1), and 82(#2), and the drop switch 86 is connected to the second output ports 8D of the n optical switches 8 in each of the WDM ring sections 80(#1), 80(#2), 82(#1), and 82(#2).

Figure 19A:
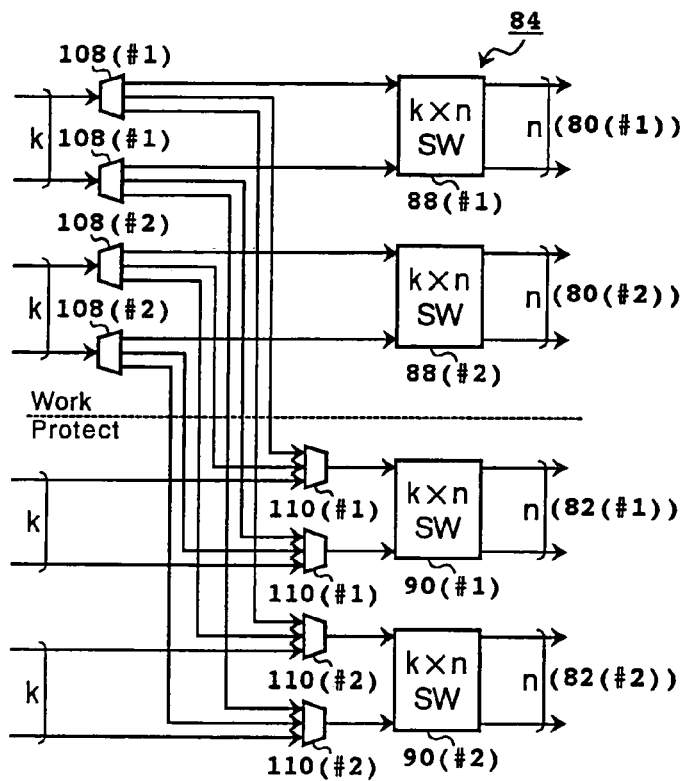
FIGS. 19A and 19B are block diagrams showing first preferred embodiments of an add switch and a drop switch shown in FIG. 18, respectively.
Figure 19B:
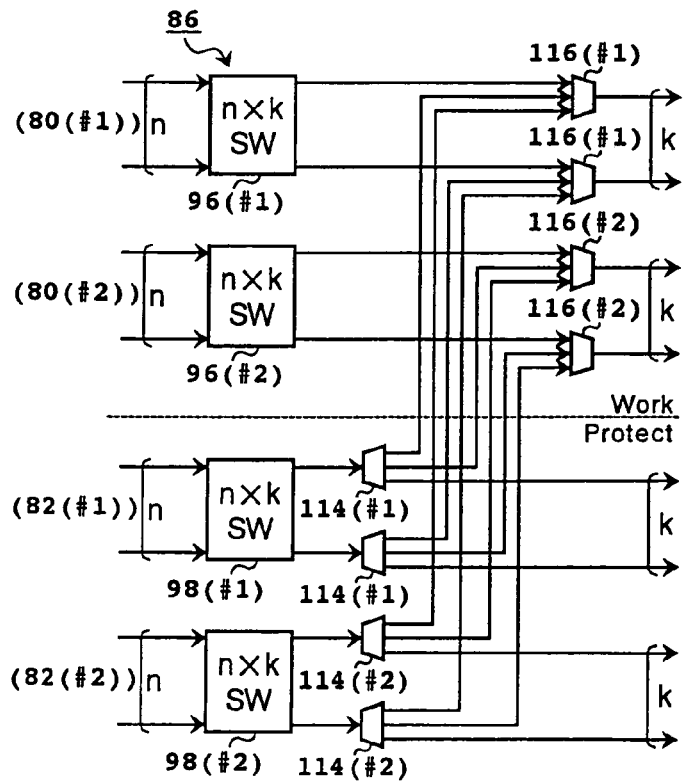

FIG. 19A is a block diagram showing a first preferred embodiment of the add switch 84 shown in FIG. 18, and FIG. 19B is a block diagram showing a firs preferred embodiment of the drop switch 86 shown in FIG. 18. As shown in FIG. 19A, the add switch 84 includes two k×n optical switches 88(#1) and 88(#2) for a main system, and two k×n optical switches 90(#1) and 90(#2) for a standby system. The add switch 84 further includes k 1×3 optical switches 108(#1), k 1×3 optical switches 108(#2), k 3×1 optical switches 110(#1), and k 3×1 optical switches 110(#2), so as to switch each input of the optical switches 88(#1) and 88(#2) to each input of the optical switches 90(#1) and 90(#2).

In the add switch 84 shown in FIG. 19A, the optical signal to be added from another network device is switched by the corresponding 1×3 optical switch 108(#1) or 108(#2). Then, this optical signal is normally input into the main fiber 80(#1) or 80(#2), whereas in case of failure, this optical signal is input into the standby fiber 82(#1) or 82(#2). To this end, the optical switches 88(#1) and 88(#2), the optical switches 90(#1) and 90(#2), the optical switches 108(#1) and 108(#2), and the optical switches 110(#1) and 110(#2) are interconnected.

As shown in FIG. 19B, the drop switch 86 includes two n×k optical switches 96(#1) and 96(#2) for a main system, and two n×k optical switches 98(#1) and 98(#2) for a standby system. The drop switch 86 further includes k 1×3 optical switches 114(#1), k 1×3 optical switches 114(#2), k 3×1 optical switches 116(#1), and k 3×1 optical switches 116(#2), so as to switch each output of the optical switches 96(#1) and 96(#2) to each output of the optical switches 98(#1) and 98(#2).

In the drop switch 86 shown in FIG. 19B, the switching is performed so that the output from the main fiber 80(#1) or 80(#2) is normally dropped to another network device, whereas in case of failure, the output from the standby fiber 82(#1) or 82(#2) is dropped to another network device. To this end, the optical switches 96(#1) and 96(#2), the optical switches 98(#1) and 98(#2), the optical switches 114(#1) and 114(#2), and the optical switches 116(#1) and 116(#2) are interconnected.

In any case, the k×n optical switches 88(#1), 88(#2), 90(#1), and 90(#2) control so that the wavelength conversion to a desired wavelength in the ring is performed, and the n×k optical switches 96(#1), 96(#2), 98(#1), and 98(#2) control so that an optical signal is output to a desired port.

Generally, the number k of ports for adding/dropping is smaller than the number n of wavelengths of the WDM signal light, so that (n−k) low-priority signals can be transmitted even in case of failure.

Figure 1:
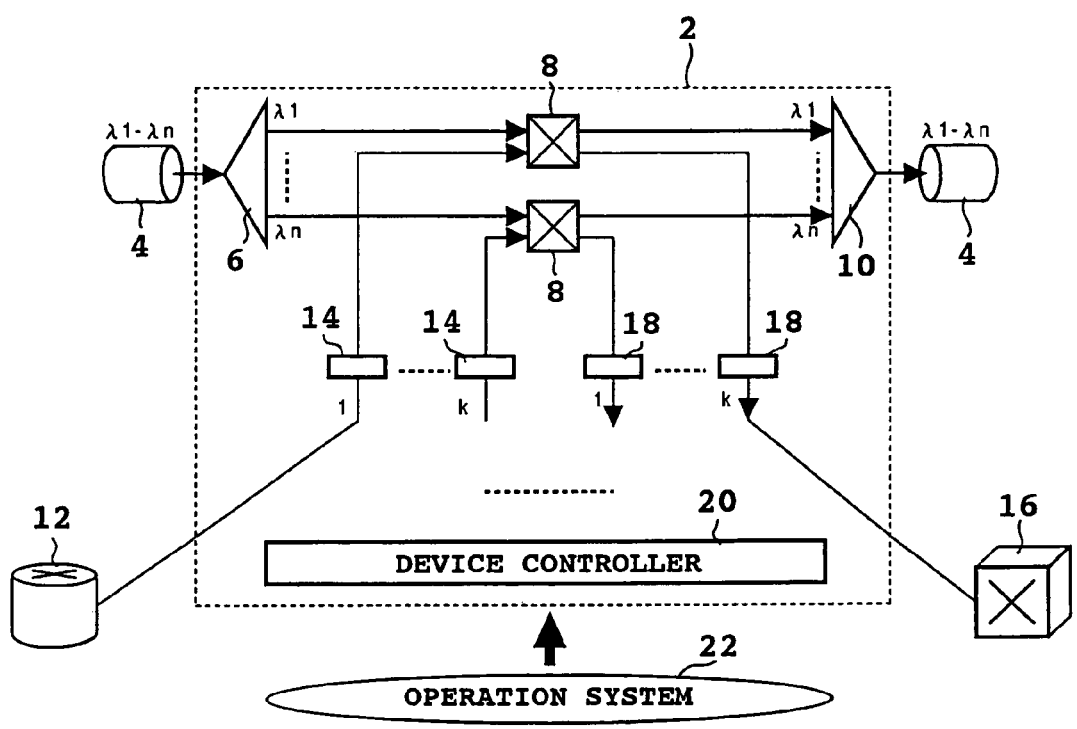
FIG. 1 is a block diagram of a general optical add/drop device in the prior art.
Figure 2:
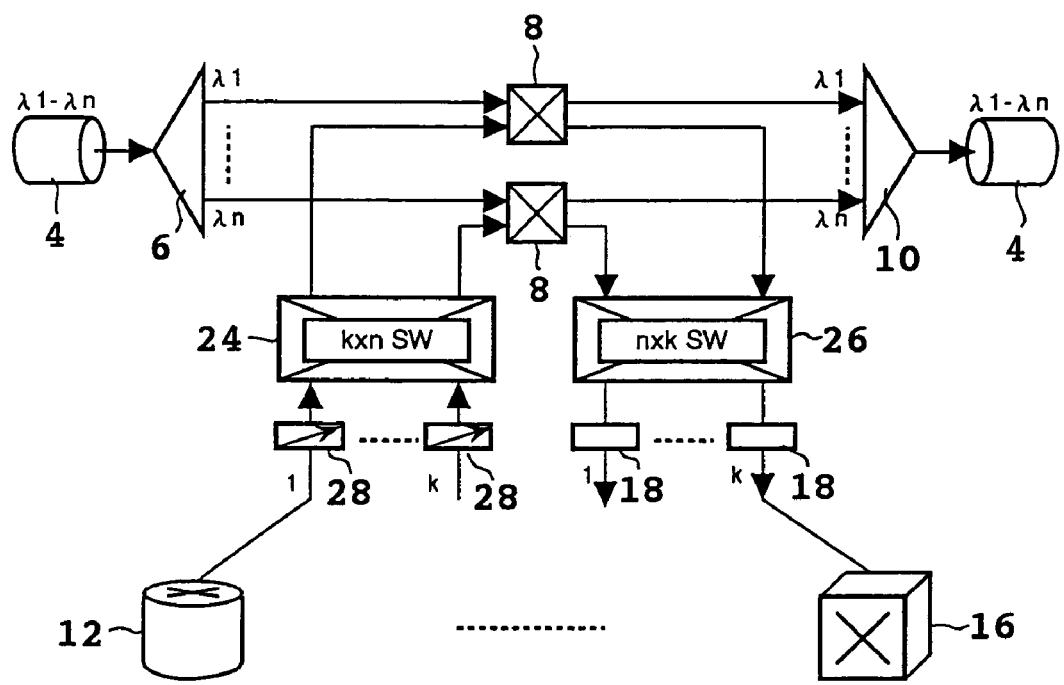
FIG. 2 is a block diagram of an improved optical add/drop device in the prior art.
Figure 3A:
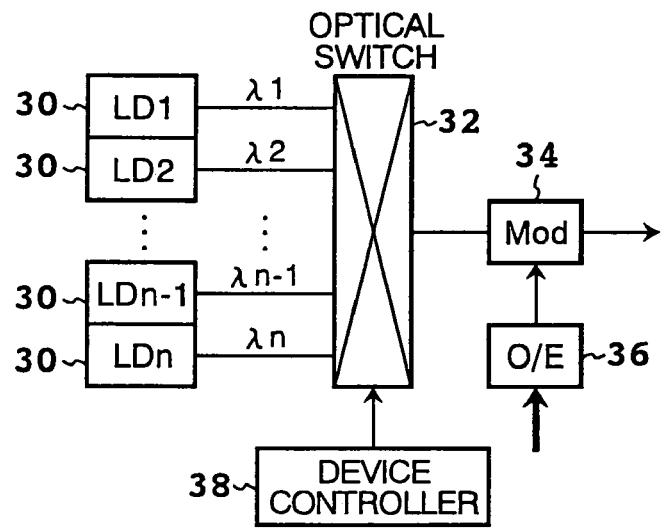
FIGS. 3A and 3B are block diagrams of different tunable light sources in the prior art.
Figure 3B:
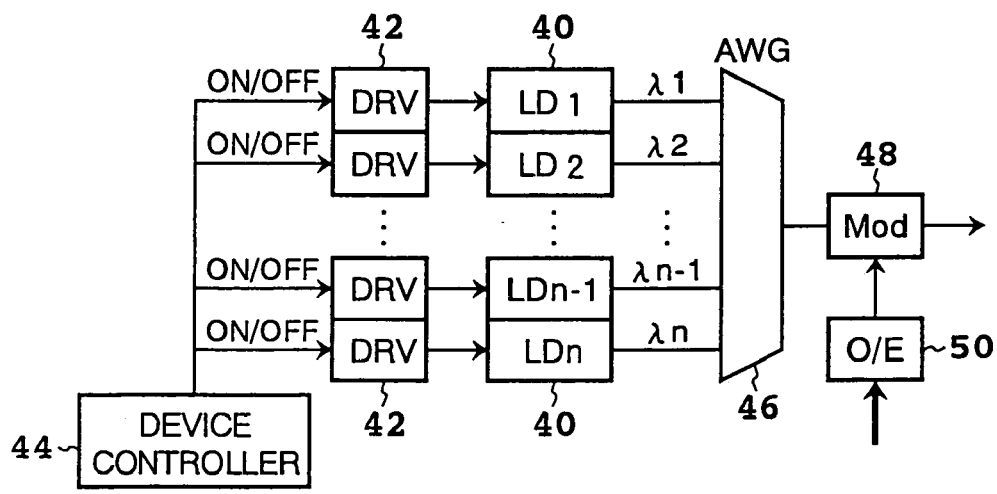
Figure 20A:
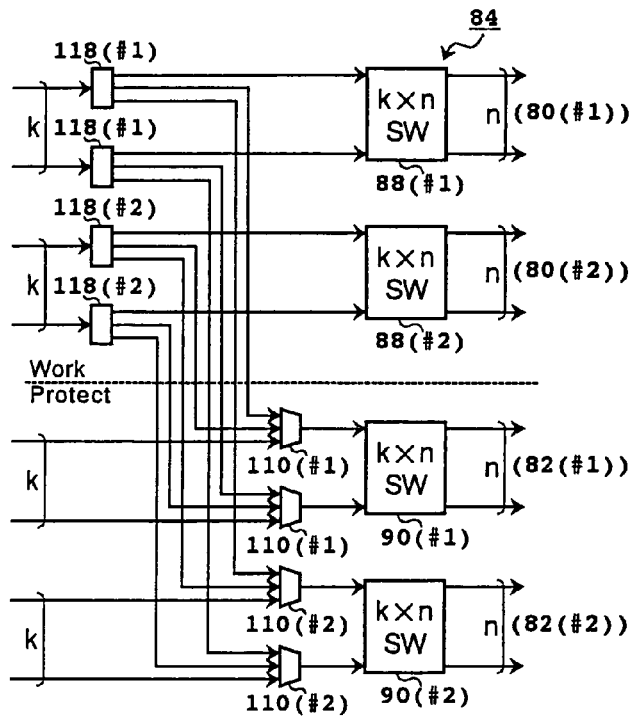
FIGS. 20A and 20B are block diagrams showing second preferred embodiments of an add switch and a drop switch shown in FIG. 18, respectively.
Figure 20B:
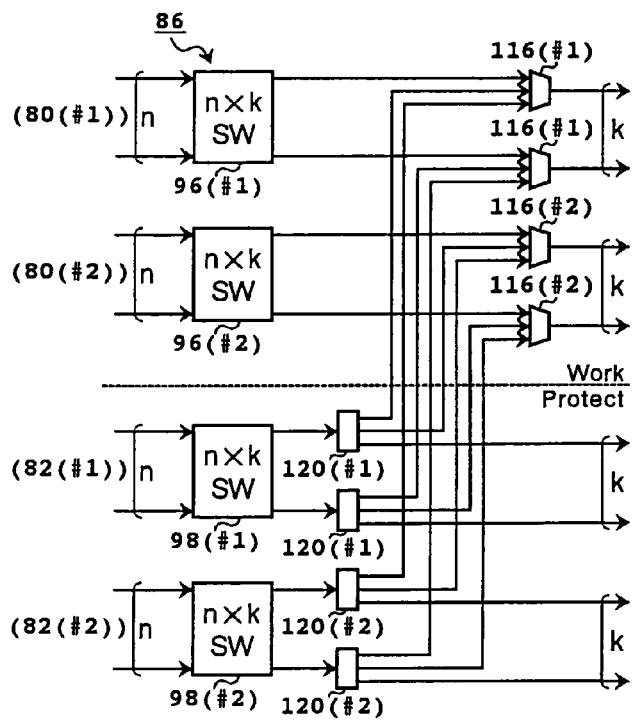

FIG. 20A is a block diagram showing a second preferred embodiment of the add switch 84 shown in FIG. 18, and FIG. 20B is a block diagram showing a second preferred embodiment of the drop switch 86 shown in FIG. 18. In the preferred embodiment shown in FIG. 20A, 1×3 optical couplers 118(#1) and 118(#2) are used in place of the 1×3 optical switches 108(#1) and 108(#2) shown in FIG. 19A, respectively. In the preferred embodiment shown in FIG. 20B, 1×3 optical couplers 120(#1) and 120(#2) are used in place of the 1×3 optical switches 114(#1) and 114(#2) shown in FIG. 19B, respectively. Also in these preferred embodiments, the switching in case of failure can be easily performed in the optical add/drop device in a similar manner.

Figure 21A:
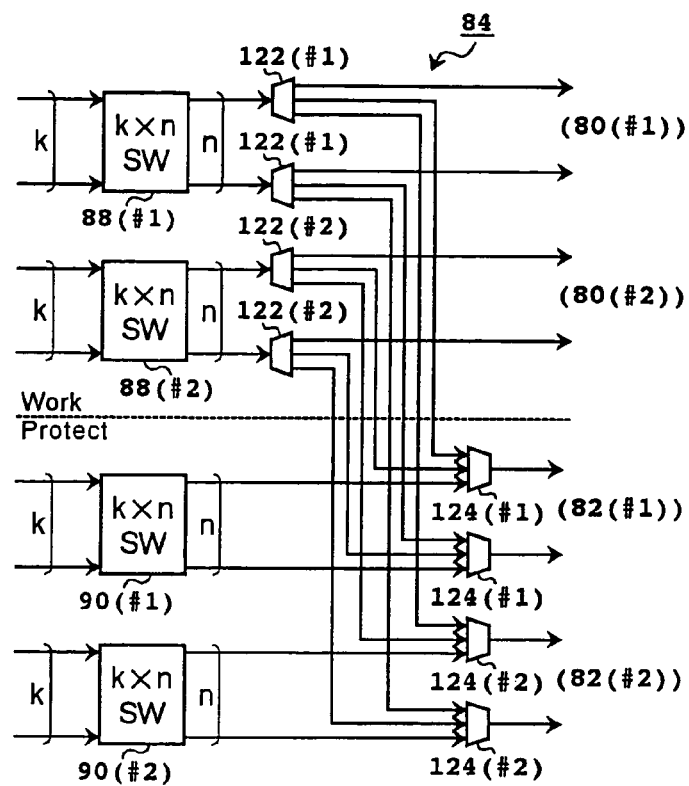
FIGS. 21A and 21B are block diagrams showing third preferred embodiments of an add switch and a drop switch shown in FIG. 18, respectively.
Figure 21B:
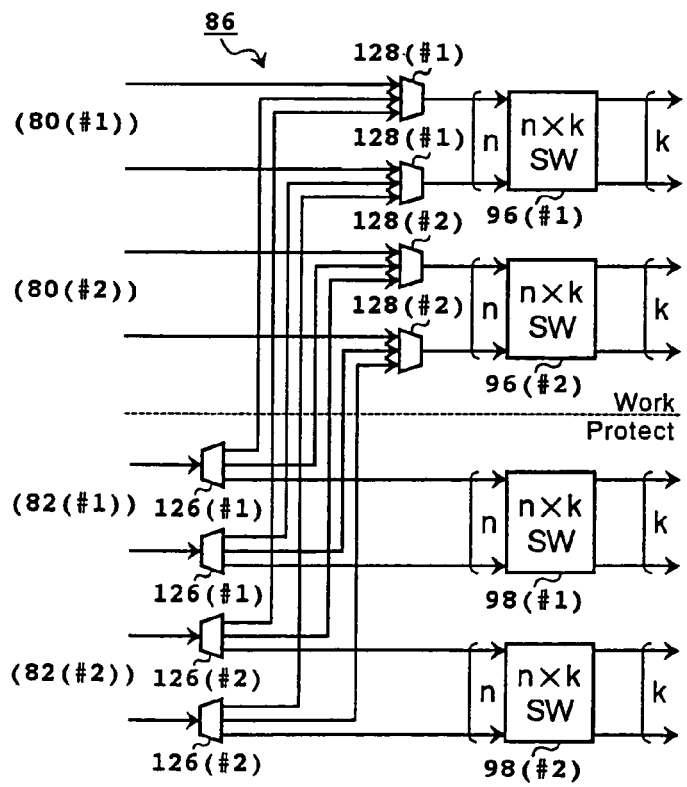

FIG. 21A is a block diagram showing a third preferred embodiment of the add switch 84 shown in FIG. 18, and FIG. 21B is a block diagram showing a third preferred embodiment of the drop switch 86 shown in FIG. 18. As shown in FIG. 21A, the add switch 84 includes two k×n optical switches 88(#1) and 88(#2) for a main system, and two k×n optical switches 90(#1) and 90(#2) for a standby system. The add switch 84 further includes n 1×3 optical switches 122(#1) provided on the output side of the optical switch 88(#1), n 1×3 optical switches 122(#2) provided on the output side of the optical switch 88(#2), n 3×1 optical switches 124(#1) provided on the output side of the optical switch 90(#1), and n 3×1 optical switches 124(#2) provided on the output side of the optical switch 90(#2), so as to switch each output of the optical switches 90(#1) and 90(#2) to each output of the optical switches 88(#1) and 88(#2). The operation of this preferred embodiment will be understood from the similarity to the operation of the preferred embodiment shown in FIG. 14A, so the description thereof will be omitted herein.

As shown in FIG. 21B, the drop switch 86 includes two n×k optical switches 96(#1) and 96(#2) for a main system, and two n×k optical switches 98(#1) and 98(#2) for a standby system. The drop switch 86 further includes n 3×1 optical switches 128(#1) provided on the input side of the optical switch 96(#1), n 3×1 optical switches 128(#2) provided on the input side of the optical switch 96(#2), n 1×3 optical switches 126(#1) provided on the input side of the optical switch 98(#1), and n 1×3 optical switch 126(#2) provided on the input side of the optical switch 98(#2), so as to switch each input of the optical switches 96(#1) and 96(#2) to each input of the optical switches 98(#1) and 98(#2). The operation of this preferred embodiment will be understood from the similarity to the operation of the preferred embodiment shown in FIG. 14B, so the description thereof will be omitted herein.

In any case, the k×n optical switches 88(#1), 88(#2), 90(#1), and 90(#2) control so that the wavelength conversion to a desired wavelength in the ring is performed, and the n×k optical switches 96(#1), 96(#2), 98(#1), and 98(#2) control so that an optical signal is output to a desired port.

Generally, the number of k of ports for adding/dropping is smaller than the number n of wavelengths of the WDM signal light, so that (n−k) low-priority signals can be transmitted even in case of failure.

Figure 22A:
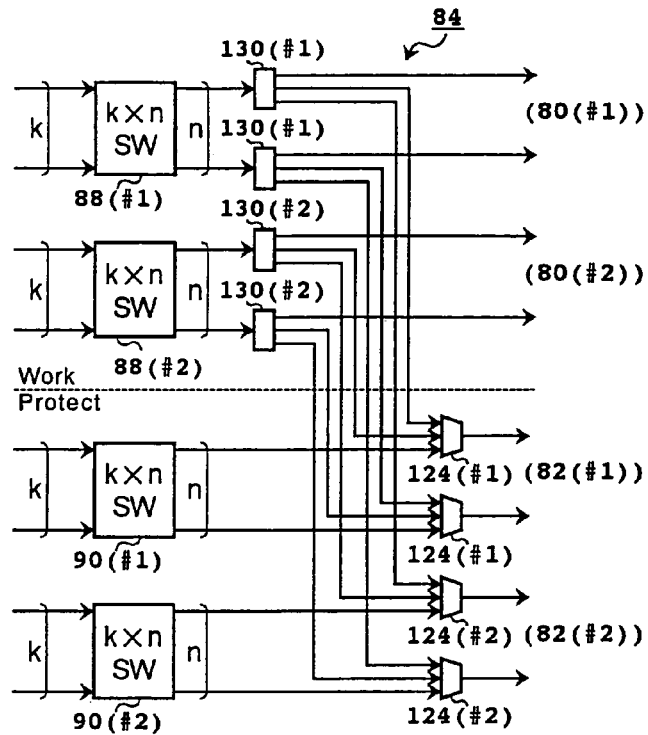
FIGS. 22A and 22B are block diagrams showing fourth preferred embodiments of an add switch and a drop switch shown in FIG. 18, respectively.
Figure 22B:
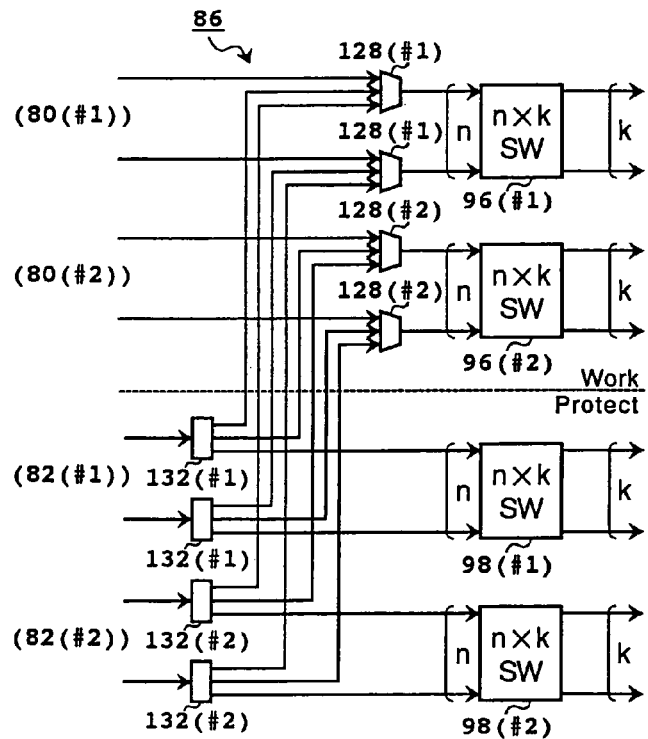

FIG. 22A is a block diagram showing a fourth preferred embodiment of the add switch 84 shown in FIG. 18, and FIG. 22B is a block diagram showing a fourth preferred embodiment of the drop switch 86 shown in FIG. 18. In the preferred embodiment shown in FIG. 22A, 1×3 optical couplers 130(#1) and 130(#2) are used in place of the 1×3 optical switches 122(#1) and 122(#2) shown in FIG. 21A, respectively. In the preferred embodiment shown in FIG. 22B, 1×3 optical couplers 132(#1) and 132(#2) are used in place of the 1×3 optical switches 126(#1) and 126(#2) shown in FIG. 21B, respectively. Also in these preferred embodiments, the switching in case of failure can be easily performed in the optical add/drop device in a similar manner.

According to the present invention as described above, it is possible to provide an optical add/drop device which can increase a transmission distance between nodes to thereby allow long-haul transmission. Further, it is also possible to provide a low-cost optical add/drop device which can eliminate the need for a tunable wavelength converter including a tunable light source at an interface between the optical add/drop device and another network device. Further, it is also possible to improve the operation efficiency within an optical network and to reduce the scale of hardware for switching.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical add/drop device adapted to first and second optical paths, comprising:

first and second optical add/drop units connected to said first and second optical paths, respectively;

an add switch for selectively adding an optical signal to any one of said first and second optical add/drop units; and a drop switch for selectively dropping an optical signal from any one of said first and second optical add/drop units;

each of said first and second optical add/drop units comprising:

an optical demultiplexer for separating WDM signal light into n (n is an integer satisfying 1<n) optical signals having different wavelengths, said WDM signal light being obtained by wavelength division multiplexing said n optical signals;

n optical switches each having first and second input ports and first and second output ports, said n optical signals output from said optical demultiplexer being supplied to said first input ports of said n optical switches, respectively;

n regenerators connected to said first output ports of said n optical switches, respectively; and an optical multiplexer for wavelength division multiplexing optical signals output from said n regenerators;

said add switch being connected to said second input ports of said n optical switches and adding said optical signal to one of said second input ports of said first and second optical add/drop unit;

said drop switch being connected to said second output ports of said n optical switches and dropping said optical signal to one of said second output ports of said first and second optical add/drop units.

2. The optical add/drop device according to claim 1, wherein the add switch further comprises:
   a first optical add switch selecting an optical add signal from another network device,
   a second optical add switch normally switching the selected optical add signal to the first optical path, and
   a third optical add switch switching the optical add signal to the second optical path in a case of failure.

3. The optical add/drop device according to claim 1, wherein the drop switch further comprises:
   a first optical drop switch normally selecting an output from the first optical path and in a case of failure selecting an output from the second optical path, and
   a second optical drop switch selecting another network device to receive the selected output.

* * * * *